(12) United States Patent
Maloney

(10) Patent No.: US 10,496,600 B2
(45) Date of Patent: Dec. 3, 2019

(54) CONTENT FILE SUGGESTIONS

(71) Applicant: Microsoft Technology Licensing, LLC, Redmond, WA (US)

(72) Inventor: Christopher Michael Maloney, San Francisco, CA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 799 days.

(21) Appl. No.: 15/081,270

(22) Filed: Mar. 25, 2016

(65) Prior Publication Data

US 2017/0139930 A1 May 18, 2017

Related U.S. Application Data

(60) Provisional application No. 62/255,036, filed on Nov. 13, 2015.

(51) Int. Cl.
| | | |
|---|---|---|
| *G06F 16/11* | (2019.01) | |
| *G06F 16/16* | (2019.01) | |
| *G06F 16/28* | (2019.01) | |
| *G06F 16/2457* | (2019.01) | |
| *H04L 29/08* | (2006.01) | |
| *G06F 17/22* | (2006.01) | |
| *G06F 17/24* | (2006.01) | |

(52) U.S. Cl.
CPC ............ *G06F 16/116* (2019.01); *G06F 16/16* (2019.01); *G06F 16/24578* (2019.01); *G06F 16/285* (2019.01); *G06F 17/2229* (2013.01); *G06F 17/248* (2013.01); *H04L 67/06* (2013.01)

(58) Field of Classification Search
USPC .................................................. 707/728, 741
See application file for complete search history.

(56) References Cited

U.S. PATENT DOCUMENTS

| | | | |
|---|---|---|---|
| 5,499,366 | A | 3/1996 | Rosenberg et al. |
| 5,909,689 | A | 6/1999 | Ryzin |
| 6,035,323 | A | 3/2000 | Narayen et al. |
| 6,081,262 | A | 6/2000 | Gill et al. |

(Continued)

FOREIGN PATENT DOCUMENTS

| | | |
|---|---|---|
| CN | 1828587 | 9/2006 |
| CN | 102945226 | 2/2013 |

(Continued)

OTHER PUBLICATIONS

"Final Office Action Issued in U.S. Appl. No. 15/081,351", dated Jun. 28, 2018, 15 Pages.

(Continued)

*Primary Examiner* — Cam Linh T Nguyen

(57) ABSTRACT

Systems, components, devices, and methods for generating suggestions for content files are provided. A non-limiting example is a method for generating suggestions for arranging content. The method includes the step of receiving a content file from a client, the content file including a content region and a content element. The method also includes the step of analyzing the content file to select a blueprint for the content region. The method further includes the step of generating a suggestion for arranging the content region based on the selected blueprint. Additionally, the method includes the step of transmitting the suggestion to the client.

20 Claims, 11 Drawing Sheets

(56) References Cited

U.S. PATENT DOCUMENTS

| | | | |
|---|---|---|---|
| 6,192,518 B1 | 2/2001 | Neal | |
| 6,983,068 B2 | 1/2006 | Prabhakar et al. | |
| 7,039,229 B2 | 5/2006 | Lin et al. | |
| 7,171,042 B2 | 1/2007 | Hartmann et al. | |
| 7,194,134 B2 | 3/2007 | Bradshaw | |
| 7,346,627 B2 | 3/2008 | Ramanathan et al. | |
| 7,383,509 B2 | 6/2008 | Foote et al. | |
| 7,386,791 B2 | 6/2008 | Jacobson | |
| 7,500,194 B2 | 3/2009 | Collins et al. | |
| 7,577,905 B2 | 8/2009 | Collins et al. | |
| 7,620,665 B1 | 11/2009 | George et al. | |
| 7,716,332 B1 | 5/2010 | Topfl | |
| 7,860,305 B2 | 12/2010 | Wang et al. | |
| 8,024,658 B1 | 9/2011 | Fagans et al. | |
| 8,214,742 B2 | 7/2012 | Pratt | |
| 8,416,255 B1 | 4/2013 | Gilra | |
| 8,418,059 B2 | 4/2013 | Kitada | |
| 8,478,799 B2 | 7/2013 | Beaverson et al. | |
| 8,560,952 B2 | 10/2013 | Collins et al. | |
| 8,655,111 B2 * | 2/2014 | Berger | G06F 17/30274 382/306 |
| 8,745,158 B2 | 6/2014 | Claman | |
| 8,775,918 B2 | 7/2014 | Livshin et al. | |
| 8,799,829 B2 | 8/2014 | Grosz et al. | |
| 8,890,886 B2 | 11/2014 | Kriese et al. | |
| 8,924,376 B1 * | 12/2014 | Lee | G06F 16/951 707/723 |
| 9,177,225 B1 | 11/2015 | Cordova | |
| 9,280,613 B2 | 3/2016 | Smith et al. | |
| 9,330,437 B2 | 5/2016 | Berglund et al. | |
| 9,400,610 B1 | 7/2016 | Wallace et al. | |
| 9,400,801 B1 | 7/2016 | Aplemakh et al. | |
| 9,715,485 B2 * | 7/2017 | Roth | G06F 17/218 |
| 9,824,291 B2 | 11/2017 | Maloney et al. | |
| 2002/0102018 A1 | 8/2002 | Lin et al. | |
| 2002/0186236 A1 | 12/2002 | Brown et al. | |
| 2002/0194227 A1 | 12/2002 | Day et al. | |
| 2003/0037010 A1 | 2/2003 | Schmelzer | |
| 2004/0001106 A1 | 1/2004 | Deutscher et al. | |
| 2004/0034829 A1 | 2/2004 | Ohashi et al. | |
| 2004/0243930 A1 | 12/2004 | Schowtka et al. | |
| 2005/0100223 A1 | 5/2005 | de Queiroz | |
| 2005/0108619 A1 | 5/2005 | Theall et al. | |
| 2005/0171758 A1 | 8/2005 | Palmquist | |
| 2006/0036965 A1 | 2/2006 | Harris et al. | |
| 2006/0126932 A1 | 6/2006 | Eschbach | |
| 2006/0136520 A1 | 6/2006 | Leppinen et al. | |
| 2006/0136827 A1 | 6/2006 | Villaron et al. | |
| 2006/0156218 A1 | 7/2006 | Lee | |
| 2006/0220983 A1 | 10/2006 | Isomura et al. | |
| 2006/0259858 A1 | 11/2006 | Collins et al. | |
| 2006/0282779 A1 | 12/2006 | Collins et al. | |
| 2006/0294046 A1 | 12/2006 | Sareen et al. | |
| 2007/0019924 A1 | 1/2007 | Teo et al. | |
| 2007/0185926 A1 | 8/2007 | Prahlad et al. | |
| 2007/0196013 A1 | 8/2007 | Li et al. | |
| 2007/0198523 A1 | 8/2007 | Hayim | |
| 2007/0291049 A1 | 12/2007 | Edwards et al. | |
| 2008/0005195 A1 | 1/2008 | Li | |
| 2008/0075360 A1 | 3/2008 | Li et al. | |
| 2008/0276176 A1 | 11/2008 | Wahba et al. | |
| 2009/0049064 A1 | 2/2009 | Alquier et al. | |
| 2009/0051826 A1 | 2/2009 | Chang | |
| 2009/0077261 A1 | 3/2009 | Broadhurst et al. | |
| 2009/0116752 A1 | 5/2009 | Isomura et al. | |
| 2009/0252413 A1 | 10/2009 | Hua et al. | |
| 2010/0082672 A1 | 4/2010 | Kottomtharayil et al. | |
| 2010/0082713 A1 | 4/2010 | Frid-nielsen et al. | |
| 2010/0088297 A1 | 4/2010 | Kiilerich et al. | |
| 2010/0088605 A1 | 4/2010 | Livshin et al. | |
| 2010/0092076 A1 | 4/2010 | Iofis | |
| 2010/0158380 A1 | 6/2010 | Neville et al. | |
| 2010/0289818 A1 | 11/2010 | Hirooka | |
| 2010/0332401 A1 | 12/2010 | Prahlad et al. | |
| 2011/0058736 A1 | 3/2011 | Tokungaga | |
| 2011/0125722 A1 | 5/2011 | Rae Goutham et al. | |
| 2011/0131341 A1 | 6/2011 | Yoo et al. | |
| 2011/0157221 A1 | 6/2011 | Ptucha et al. | |
| 2011/0221764 A1 | 9/2011 | Callens et al. | |
| 2011/0234613 A1 | 9/2011 | Hanson | |
| 2011/0243453 A1 | 10/2011 | Kashima et al. | |
| 2011/0246893 A1 | 10/2011 | Paas et al. | |
| 2011/0280476 A1 | 11/2011 | Berger et al. | |
| 2012/0105467 A1 | 5/2012 | Chao et al. | |
| 2012/0106859 A1 | 5/2012 | Cheatle | |
| 2012/0275704 A1 | 11/2012 | Cok et al. | |
| 2013/0028521 A1 | 1/2013 | Yabu | |
| 2013/0111373 A1 | 5/2013 | Kawanishi et al. | |
| 2013/0124980 A1 | 5/2013 | Hudson et al. | |
| 2013/0239002 A1 | 9/2013 | Maloney et al. | |
| 2013/0279773 A1 | 10/2013 | Masumoto | |
| 2014/0195575 A1 | 7/2014 | Haustein et al. | |
| 2014/0282009 A1 | 9/2014 | Avrahami | |
| 2014/0380171 A1 | 12/2014 | Maloney et al. | |
| 2015/0046791 A1 | 2/2015 | Isaacson | |
| 2015/0095385 A1 | 4/2015 | Mensch et al. | |
| 2015/0113411 A1 | 4/2015 | Underwood et al. | |
| 2015/0277726 A1 | 10/2015 | Maloney et al. | |
| 2015/0310124 A1 | 10/2015 | Ben-Aharon et al. | |
| 2016/0171954 A1 | 6/2016 | Guo | |
| 2016/0179826 A1 | 6/2016 | Batra | |
| 2017/0026552 A1 | 1/2017 | Tomono | |
| 2017/0139978 A1 | 5/2017 | Hayworth et al. | |
| 2017/0140241 A1 | 5/2017 | Maloney et al. | |
| 2017/0140250 A1 | 5/2017 | Maloney et al. | |
| 2018/0217742 A1 | 8/2018 | Maloney et al. | |

FOREIGN PATENT DOCUMENTS

| | | | |
|---|---|---|---|
| EP | 1085464 | A2 | 3/2001 |
| EP | 1657648 | A2 | 5/2006 |
| EP | 2503759 | A1 | 9/2012 |
| EP | 3119062 | A1 | 1/2017 |
| WO | 1995019003 | | 7/1995 |
| WO | 2001093563 | A2 | 12/2001 |
| WO | 2006123328 | A1 | 11/2006 |
| WO | 2006126628 | A1 | 11/2006 |
| WO | 2009085526 | A1 | 7/2009 |
| WO | 2012047253 | A3 | 4/2012 |
| WO | 2013059545 | A1 | 4/2013 |
| WO | 2014015081 | A2 | 1/2014 |
| WO | 2014131194 | A1 | 9/2014 |

OTHER PUBLICATIONS

"Second Office Action Issued in Chinese Patent Application No. 201480036154.4", dated Jul. 16, 2018, 6 Pages.

PCT Written Opinion dated Sep. 11, 2017 cited in Application No. PCT/US2016/060414, 8 pgs.

PCT International Preliminary Report dated Sep. 22, 2017 cited in Application No. PCT/US2016/060424, 14 pgs.

PCT 2nd Written Opinion dated Jul. 31, 2017 cited in Application No. PCT/US2016/060416, 11 pgs.

Chinese Office Action dated Nov. 16, 2017 cited in Application No. 201480036154.4, 10 pgs.

International Preliminary Report on Patentability Issued in PCT Application No. PCT/US2016060414, dated Jan. 4, 2018, 9 Pages.

About layouts, Retrieved on: Mar. 26, 2013, Available at: http://office.microsoft.com/en-in/powerpoint-help/about-layouts-HP003082915.aspx.

Leading the way in Microsoft Office Development, Retrieved on: Mar. 26, 2013,Available at: http://www.bettersolutions.com/powerpoint/PIZ113/YU112210331.htm.

PCT International Preliminary Report on Patentability Issued in PCT Application No. PCT/US2014/041025, dated Oct. 7, 2015, 8 Pages.

PCT International Search Report dated Nov. 26, 2014 in Application No. PCT/US2014/041025, 9 pgs.

PCT Second Written Opinion Issued in Patent Application No. PCT/US2014/041025, dated Jun. 5, 2015, 7 Pages.

(56) References Cited

OTHER PUBLICATIONS

U.S. Appl. No. 11/152,755 Notice of Allowance dated Jun. 8, 2009 8 pgs.
U.S. Appl. No. 11/152,755 Office Action dated Sep. 4, 2008 7 pgs.
U.S. Appl. No. 11/152,755 Response dated Feb. 4, 2009 8 pgs.
U.S. Appl. No. 13/925,114 Office Action dated Mar. 10, 2016 7 pgs.
U.S. Appl. No. 13/925,114 Amendment dated Jul. 11, 2016 12 pgs.
"Create a slide layout that meets your needs", Retrieved on: Oct. 28, 2015, Available at:https://support.office.com/en-us/article/Create-a-slide-layout-that-meets-your-needs-f881f3a5-522b-4ff8-a496-10a74771a14c, 2 pgs.
Abela, "Announcing the Slide Chooser", Published on: Jan. 14, 2015, 4 pgs., available at: http://extremepresentation.typepad.com/blog/2015/01/announcing-the-slide-chooser.html.
Athitsos et al., "Distinguishing Photographs and Graphics on the World Wide Web", In Proceedings of IEEE Workshop on Content-Based Access of Image and Video Libraries, Jun. 20, 1997, pp. 1-7.
Behera et al., "Combing Color and Layout Features for the Identification of Low-resolution Documents", Google, Mar. 2005, 8 pgs.
Chen et al., "Artistic Image Analysis using the Composition of Human Figures", In Proceedings of European Conference on Computer Vision, Sep. 6, 2014, pp. 1-15.
Chen et al., "Identifying Computer Graphics Using HSV Color Model and Statistical Moments of Characteristic Functions", In Proceedings of IEEE International Conference on Multimedia and Expo, Jul. 2, 2007, 4 pgs.
Deng et al., "Color Image Segmentation", In Proceedings of Conference on Computer Vision and Pattern Recognition, vol. 2, Jun. 23, 1999, 6 pgs.
Dogar et al., "Ditto—A System for Opportunistic Caching in Multi-hop Wireless Networks", In Proceedings of the 14th ACM International Conference on Mobile Computing and Networking, Sep. 14, 2008, 12 pgs.
Krinidis et al., "An Unsupervised Image Clustering Method Based on EEMD Image Histogram", In Journal of Information Hiding and Multimedia Signal Processing, vol. 3, No. 2, Apr. 2012, pp. 151-163.
Luo et al., "Natural Scene Classification using Overcomplete ICA", In Journal of Pattern Recognition, vol. 38, No. 10, Oct. 2005, pp. 1507-1519.
Morse et al., "Image-based Color Schemes", In Proceedings of IEEE International Conference on Image Processing, vol. 3, Sep. 16, 2007, pp. 497-500.
Muthitacharoen et al., "A Low-bandwidth Network File System", In Proceedings of Eighteenth ACM Symposium on Operating Systems Principles, Oct. 21, 2004, 14 pgs.
Ng et al., "Classifying Photographic and Photorealistic Computer Graphic Images using Natural Image Statistics", In ADVENT Technical Report #220-2006-6, Oct. 2004, pp. 1-20.
Park et al., "Supporting Practical Content-Addressable Caching with CZIP Compression", In Proceedings of USENIX Annual Technical Conference, Jun. 17, 2007, 24 pgs.
Prabhakar et al., "Picture-Graphics Color Image Classification", In Proceedings of International Conference on Image Processing, vol. 2, Sep. 22, 2002, 5 pgs.
Tridgell et al., "The Rsync Algorithm", In Technical Report TR-CS-96-05 of The Australian National Unversity, Jun. 18, 1996, 8 pgs.
PCT International Search Report dated Feb. 1, 2017 cited in Application No. PCT/US2016/060424, 13 pgs.
PCT International Search Report dated Feb. 8, 2017 cited in Application No. PCT/US2016/060498, 11 pgs.
PCT International Search Report and Written Opinion dated Mar. 2, 2017 cited in Application No. PCT/US2016/060414, 13 pgs.
PCT International Search Report and Written Opinion dated Mar. 2, 2017 cited in Application No. PCT/US2016/060416, 23 pgs.
U.S. Final Office Action dated Oct. 12, 2016 cited in U.S. Appl. No. 13/925,114, 18 pgs.
U.S. Office Action dated Mar. 10, 2017 cited in U.S. Appl. No. 15/081,416, 14 pgs.
U.S. Office Action dated Oct. 19, 2017 cited in U.S. Appl. No. 15/081,351, 33 pgs.
International Preliminary Report on Patentability dated Sep. 28, 2017 cited in Application No. PCT/US2016/060498, 7 pgs.
International Preliminary Report on Patentability dated Oct. 18, 2017 cited in Application No. PCT/US2016/060416, 12 pgs.
"Non Final Office Action Issued in U.S. Appl. No. 15/081,111", dated Nov. 14, 2018, 14 Pages.
"Office Action Issued in European Patent Application No. 14735771.9", dated Mar. 20, 2019, 9 Pages.
"Final Office Action Issued in U.S. Appl. No. 15/081,111", dated May 2, 2019, 14 Pages.
"Non Final Office Action Issued in U.S. Appl. No. 15/850,191", dated Jun. 28, 2019, 9 Pages.
"Notice of Allowance Issued in U.S. Appl. No. 15/081,111", dated Sep. 9, 2019, 9 Pages.

\* cited by examiner

CONTENT FILE SUGGESTIONS

CROSS-REFERENCE TO RELATED APPLICATIONS

This application claims priority to U.S. Provisional Application Ser. No. 62/255,036, entitled "CONTENT FILE SUGGESTIONS," filed on Nov. 13, 2015, the entire disclosure of which is hereby incorporated herein by reference.

BACKGROUND

Presentation editors work with presentation content files. Presentation editors typically do not offer a robust method for placing content on slides and it is often challenging for users who create presentations to envision alternatives regarding how to effectively organize slide content. Such organization is vital for conveying a message to the presentation viewer, making effective use of the slide space, and making presentations more visually interesting. Organizing content using current presentation editors may be challenging. For example, some presentation editors simply provide a few slide layouts (also referred to as "slide formats") from which to choose and only allow users to add content according to the slide format provided. Thus, reorganizing the slide requires selecting a new slide format and re-adding content. Further, presentation editors often simply overlay new content over the existing slide content, which blocks the existing content and may make it more difficult to fit the new content into the existing slide.

It is with respect to these and other general considerations that aspects have been made. Also, although relatively specific problems have been discussed, it should be understood that the aspects should not be limited to solving the specific problems identified in the background.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Aspects of the present disclosure provide a system and method for generating suggestions for how to arrange content elements of a content region in a content file. In an example, suggestions are generated for a content region in a content file based on blueprints. A non-limiting example is a method for generating suggestions for arranging content. The method includes the step of receiving a content file from a client, the content file including a content region and a content element. The method also includes the step of analyzing the content file to select a blueprint for the content region. The method further includes the step of generating a suggestion for arranging the content region based on the selected blueprint. Additionally, the method includes the step of transmitting the suggestion to the client.

Another non-limiting example is a method for presenting suggestions for arranging content. The method includes the step of receiving a trigger event and in response to the trigger event, transmitting to a server a content file, the content file including a content region and a content element. The method also includes the step of receiving, from the server, suggestions for arrangements of the content region that were generated based on blueprints. The method also includes the step of generating thumbnails based on the received suggestions. The method further includes the steps of presenting the generated thumbnails and receiving a selection of one of the presented thumbnails. Additionally, the method includes the steps of applying the suggestion associated with the selected thumbnail to the content region and transmitting the selection to the server.

Aspects may be implemented as a computer process, a computing system or as an article of manufacture such as a computer program product or computer readable media. The computer program product may be computer storage media readable by a computer system and encoding a computer program of instructions for executing a computer process.

DETAILED DESCRIPTION

Figure 1:
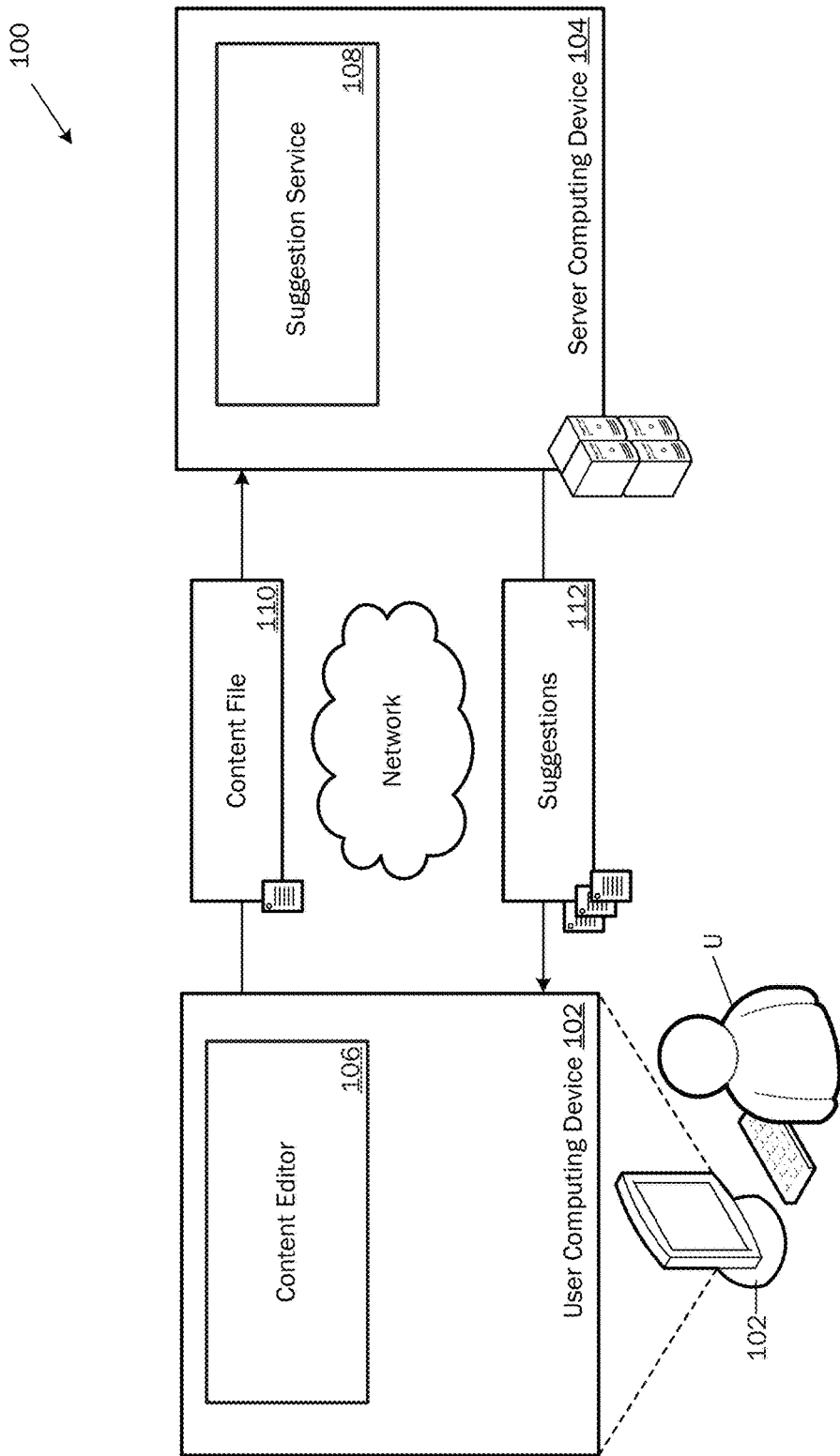
FIG. 1 is a block diagram of one example of a system for providing suggestions for a content file.

Various aspects are described more fully below with reference to the accompanying drawings, which form a part hereof, and which show specific exemplary aspects. However, aspects may be implemented in many different forms and should not be construed as limited to the aspects set forth herein; rather, these aspects are provided so that this disclosure will be thorough and complete, and will fully convey the scope of the aspects to those skilled in the art. Aspects may be practiced as methods, systems, or devices. Accordingly, aspects may take the form of a hardware implementation, an entirely software implementation or an implementation combining software and hardware aspects. The following detailed description is, therefore, not to be taken in a limiting sense.

The present disclosure describes systems and methods for suggesting arrangements of content elements within content files. Among other benefits, the disclosed technology may allow users to more quickly create aesthetically pleasing content files that effectively convey information and efficiently use space within the content file. In some aspects, the suggestions are generated based on blueprints stored in blueprint files. For example, the blueprint files may be stored using the same or a similar file format as the content files. By storing the blueprint files using the same format as the content files, the blueprint files can be generated and edited using the same tools (e.g., content editors) as are used to generate and edit the content files.

Content editors are used to create and edit content files. There are various types of content editors to edit various types of content files. Content files may include a plurality of content regions that can be consumed visually with an appropriate viewing tool. The content regions may include arrangements of content elements such as images, media, text, charts, and graphics.

For example, a presentation editor such as the POWERPOINT® presentation graphics program from Microsoft Corporation of Redmond, Wash. is used to edit presentation content files. Typically, presentation content files comprise one or more content regions in the form of slides or portions of a canvas. Some presentation files include one or more templates that may define themes and slide layouts, including background, color, fonts, effects, placeholder sizes, and positioning. For example, the POWERPOINT® presentation graphics program uses slide masters as templates for presentation content files. Additional examples of content editors include document editors such as the WORD document editing program from Microsoft Corporation of Redmond, Wash., which is used to edit document content files and spreadsheet editors such as the EXCEL® spreadsheet editing program also from Microsoft Corporation, which is used to edit spreadsheet content files. Like the presentation content files, other types of content files may also include arrangements of various content elements within content regions (e.g., pages or sections of a document content file, or sheets of a spreadsheet content file, etc.). The above listed content editors are examples and many other types of content editors are used to edit other types of content files as well. In some examples, content files are formatted with an Office Open XML File format, such as the Office Open XML Document format (which will often have a .DOCX extension), the Office Open XML Presentation format (which will often have a .PPTX extension), or the Office Open XML Workbook format (which will often have a .XLSX extension). Other formats for content files are possible as well.

In examples, a content editor presents suggestions regarding how to rearrange content elements within a content file. For example, a content editor may present one or more suggestions for arrangements of content elements within a content region. The suggestions may be presented visually (e.g., as thumbnail images of the content regions after application of a suggestion) in a user interface generated by the content editor. In some aspects, one or more suggestions are presented in a region adjacent to an editing pane of a user interface generated by the content editor. The suggestions are ordered based on the predicted suitability of the suggestion for the content region (e.g., based on the content in the content region, themes or other design elements that have been applied to the content region, previously selected suggestions, etc.). Alternatively, the suggestions are ordered according to a different criterion or only a single suggestion is presented.

A user can then provide an input to select one of the presented suggestions (e.g., by touching/clicking on the visual presentation associated with the suggestion). In response, the content editor applies the selected suggestion to the content region. In some aspects, the selection is recorded and may be used to influence the generation of suggestions in the future (e.g., suggestions similar to previously selected or frequently selected suggestions may be scored higher and may be more likely to be presented to users).

The content editor may present suggestions in response to a triggering event. An example of a triggering event is the user adding a content element to a content region. Additionally, in some aspects, a user adding only specific types of content elements is a triggering event. For example, in some aspects, a user adding an image is a triggering event, but the user adding text is not a triggering event. Another example triggering event is a user actuating a user interface element (e.g., a suggestions button) to indicate that suggestions should be provided.

In some aspects, the content editor is a component of a client computing device that interacts with a suggestion service of a server computing device. The content editor may send the content file or a portion of the content file to the suggestion service over a network. The suggestion service may then respond by sending suggestions to the client computing device. Alternatively, the suggestion service may operate on the client computing device and may even be integral with the content editor.

In some aspects, the suggestions are generated by selecting relevant blueprints and applying the selected blueprints to the content region. In some aspects, the blueprints comprise content files. In this case, the blueprint content files may include tags that identify positions in a content region for content elements and properties/characteristics for adding content elements to the blueprint. The tags may be included in a portion of the content file that is configured to store tags. However, some content file formats do not include a portion configured to store tags. In these cases, the tags may be stored in an existing portion of the file. For example, the tags may be stored in a textual field associated with a content region (e.g., a notes field) or in a textual field associated with a content element (e.g., an alternate text field). A textual field may, for example, be a field that is configured to store text data. In this manner, existing content file formats can be used to store blueprints without requiring modification to the format. As an example, a tag associated with a placeholder image (or shape) in a blueprint may indicate that the placeholder should be replaced with an image from the original content file and that the image should be cropped. The placeholder image may have certain properties such as a height, width, aspect ratio, etc. As another example, a tag associated with a shape in the blueprint may indicate an area of focus within the shape or within a separate placeholder shape or image. The tags may also include instruction for generating suggestions from the blueprint. For example, the tag may include instructions for generating suggestions that overlay certain elements over an image. Another example instruction may select a color for an element based on the colors in an image.

The suggestion service may select blueprints to use in generating the suggestions based on assessing a match between the content elements in the content region and the content elements and tags in the blueprint. For example, if an image in the content region is croppable and larger than the dimensions of a placeholder image on the blueprint, the blueprint may be more likely to be identified as a good match. Conversely, if an image in the content region is smaller than the placeholder image or is determined to be uncroppable, the blueprint may be less likely to be identified as a good match. Similarly, if a salient region (e.g., an area of interest) in an image from the content region is approximately the same size as the shape that is tagged as an area of focus on the blueprint, the blueprint may be more likely to be selected as a good match. The determination of a salient region and whether an image is croppable may be made by performing image processing techniques to analyze the content of the image, or by reading metadata associated with the image, or by other methods as well. Additionally, the suggestion service may select blueprints based on the compatibility of the blueprint and a characteristic of the content region (e.g., a theme, color scheme, style, etc.). Other factors may also be used to select blueprints. For example, the amount of text or the organizational structure of text included in the content region may influence which blueprints are selected (e.g., a blueprint designed to highlight a bulleted list may be more likely to be selected for a content region that includes a bulleted list).

Although the examples herein typically relate to a presentation editor on a client computing device interacting via a network with a suggestion service on a server computing device, other aspects are possible as well. For example, aspects that include other types of content editors are possible as well. Additionally, some aspects include a presentation editor on a server computing device or a suggestion service on a client computing device.

FIG. 1 is a block diagram of one example of a system 100 for providing suggestions for a content file. As illustrated in FIG. 1, the system 100 includes a user computing device 102 that is operable by a user U and a server computing device 104. The user computing device 102 and the server computing device 104 communicate over a network.

The user computing device 102 includes a content editor 106. In the example shown in FIG. 1, a content file 110 is transmitted by the user computing device 102 to the server computing device 104.

In some aspects, the content editor 106 is an application running on the user computing device 102 that is operable to create or edit content files. Additionally, in some aspects, the content editor 106 interacts with the server computing device 104. In some examples, the content editor 106 is a browser application operable to generate interactive graphical user interfaces based on content served by a remote computing device such as the server computing device 104 or another computing device. According to an example, an extension is installed on the user computing device 102 as a plug-in or add-on to the browser application (i.e., content editor 106) or is embedded in the browser application.

In an example, the content editor 106 is a presentation editor that operates to generate, edit, and display presentations. The POWERPOINT® presentation graphics program from Microsoft Corporation of Redmond, Wash. is an example of a presentation editor. Other example presentation editors include the KEYNOTE® application program from Apple Inc. of Cupertino, Calif.; GOOGLE SLIDES from Google Inc. of Mountain View, Calif.; HAIKU DECK from Giant Thinkwell, Inc. of Seattle, Wash.; PREZI from Prezi, Inc. of San Francisco, Calif.; and EMAZE from Visual Software Systems Ltd. of Tel-Aviv, Israel. In other examples, the content editor 106 is a document editor such as the WORD document editor from Microsoft Corporation of Redmond, Wash. or a spreadsheet editor such as the EXCEL® spreadsheet editor, also from Microsoft Corporation.

The server computing device 104 includes a suggestion service 108. In the example shown in FIG. 1, suggestions 112 are transmitted by the server computing device 104 to the user computing device 102.

In some aspects, the suggestion service 108 operates to receive a content file 110 from the user computing device 102 and to provide suggestions 112 in response. The suggestion service 108 may comprise one or more applications that are run by the server computing device 104.

For example, in some aspects, the suggestion service 108 operates to receive a presentation file from the user computing device 102. The suggestion service 108 then analyzes at least a portion of the presentation file and transmits to the user computing device 102 suggestions 112 for the layout or design of portions of the content file. For example, the content editor 106 may trigger a transmission of the content file 110 to the suggestion service 108 when an image is added to a slide in a presentation file. The suggestion service 108 may then analyze the image and the slide to provide the suggestions 112. Upon receiving the suggestions 112, the content editor 106 may generate and present to the user U thumbnails based on the suggestions 112. The user U can make a selection and indicate to the content editor 106 to apply the selected suggestion to the content file 110.

Figure 2:
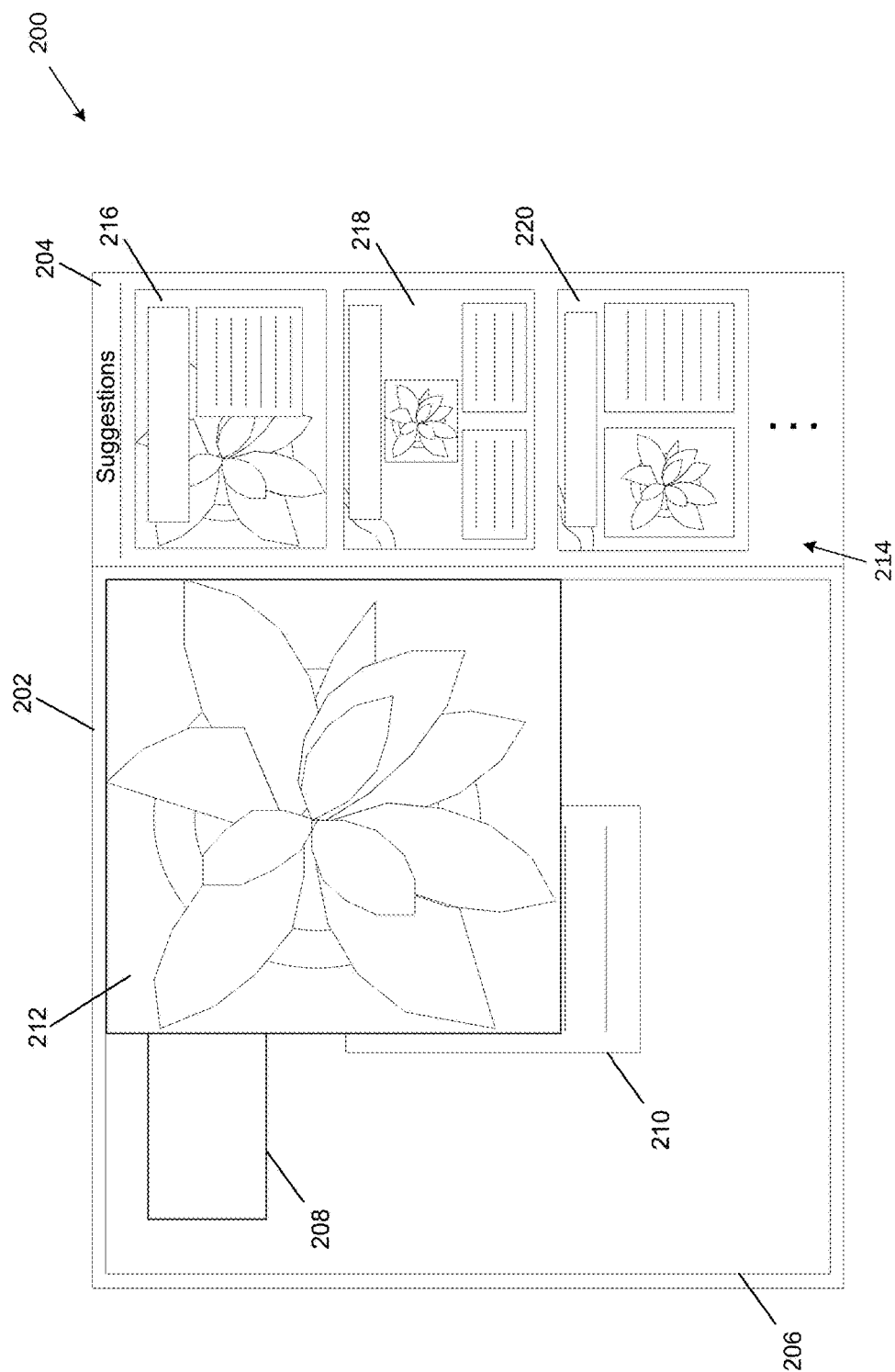
FIG. 2 illustrates an example user interface screen generated by aspects of the content editor of FIG. 1.

FIG. 2 illustrates an example user interface screen 200 generated by aspects of the content editor 106 and displayed by the user computing device 102. In this example, the screen 200 includes a content region display area 202 and a suggestion display area 204.

The content region display area 202 operates to display one or more content regions from a content file. In some aspects, a user can interact with and modify the content region that is displayed by adding, removing, repositioning, or otherwise modifying various content elements that are displayed in the content region display area 202.

In this example, the content region display area 202 displays a slide 206 from an example presentation content file. The slide 206 includes a header region 208, a list region 210, and an image 212. The image 212 has been recently added to the slide 206 by a user, but has not yet been positioned to fit well with the other content elements. Instead, the image 212 occludes the header region 208 and the list region 210. This exemplary positioning of image 212 may be typical of the initial positioning of newly added content element.

Although the image 212 is shown in the upper-right corner of the slide 206 in this example, in some aspects, the initial placement of the image 212 may be placed elsewhere on the slide 206. For example, the initial placement of image 212 may depend on various factors such as, but not limited to, whether the image 212 is being inserted into a content placeholder (i.e., a predefined area of the slide 206), a position of the content placeholder, a type of content placeholder, a size of the content placeholder, and a size of the inserted image.

The suggestion display area 204 comprises a list 214 of suggestions for the slide 206. In this example, the list 214 includes a first suggestion 216, a second suggestion 218, and a third suggestion 220. Other aspects include fewer or more suggestions. The suggestions are shown as thumbnails, which, upon being selected, cause the slide 206 to be arranged in accordance with the suggestion. Although thumbnails are discussed, one skilled in the art may envision various alternative methods of displaying generated suggestions, such as in a new window, in a drop down menu, nested within a ribbon in the application, etc.

The suggestion display area 204 is shown as a vertical bar on the right side of the screen 200. However in other aspects, the suggestion display area 204 is shown as a drop down menu or a separate window or is placed horizontally above or below the content region display area 202. Still further, the suggestion display area 204 may be located elsewhere.

In some aspects, after the user adds the image 212 to the slide 206, the content editor 106 automatically sends the presentation content file or a part thereof (e.g., the slide 206) to the suggestion service 108 on the server computing device 104. In response, the suggestion service 108 sends back the list 214 of suggestions. The list 214 of suggestions may be ordered based on a predicted likelihood the suggestion will be selected (e.g., the suggestion service 108 may calculate scores for each of the suggestions based on how well the content region fits the suggestion). For example, the suggestion shown at the top of the list may be predicted to be the most likely to be selected. Alternatively, the suggestions may be ordered otherwise as well.

The suggestions may include various arrangements of the content elements of the slide 206. The suggestions may include variations of content size, content position, content type, number of content placeholders, suggested content, background, or other properties of the slide. Content design suggestions may be based on analysis of content on the current slide, content on the previous or next slide, content within the entire content file, a theme associated with the content file, user history data, user preferences, rules or heuristics about types of content, or other data. In some aspects, the suggestions are generated using blueprints that may be selected based on at least some of the above-mentioned factors as well as other factors.

For example, the suggestions may include arrangements of text, images, charts, video, or any combination thereof. In the example of FIG. 2, the first suggestion 216 includes the image as a full sized background with the header and list overlaid thereon, the second suggestion 218 includes the image centered on the slide with the header positioned above and the list divided in two parts below, and the third suggestion 220 includes the image on the left side of the slide with the header positioned above it and the list positioned to the right of it. The first suggestion 216, the second suggestion 218, and the third suggestion 220 are just examples. And many other suggestions are possible as well. For example, some suggestions may crop the image or add various content elements to accentuate the image or a portion of the image. In some aspects, the number of suggestions depends on the content that is inserted, the content that is already on the slide, the content on other slides in the same content file, user history with the content, and/or the preferences of the user.

In some aspects, the suggestion service 108 may analyze the content and thereafter provide additional design suggestions for displaying other content on a slide. For example, if a slide includes statistics in the form of text, the presentation application may analyze the data and provide alternative means of displaying this data on a slide, such as in the form of a graph. As an example, if a quadratic equation had been entered in a text content placeholder, then a content design suggestion may include a chart of a parabola. The suggestion service 108 may query a search server for additional content, which may be of the same or different type, to display with or instead of the content. Alternatively or additionally, the suggestion service 108 may retrieve related, supplemental data from a repository or a database and insert additional data not included on the slide. For example, the presentation application may include additional statistics, related to content inserted on the slide that is retrieved from a database. As another example, if a user added an image of a beach, the suggestion service may analyze this image and generate suggestions that incorporate alternative pictures of beaches retrieved from a database. Hence, the suggestions may be used to supplement content on a slide or used to entirely replace content on a slide.

Figure 3:
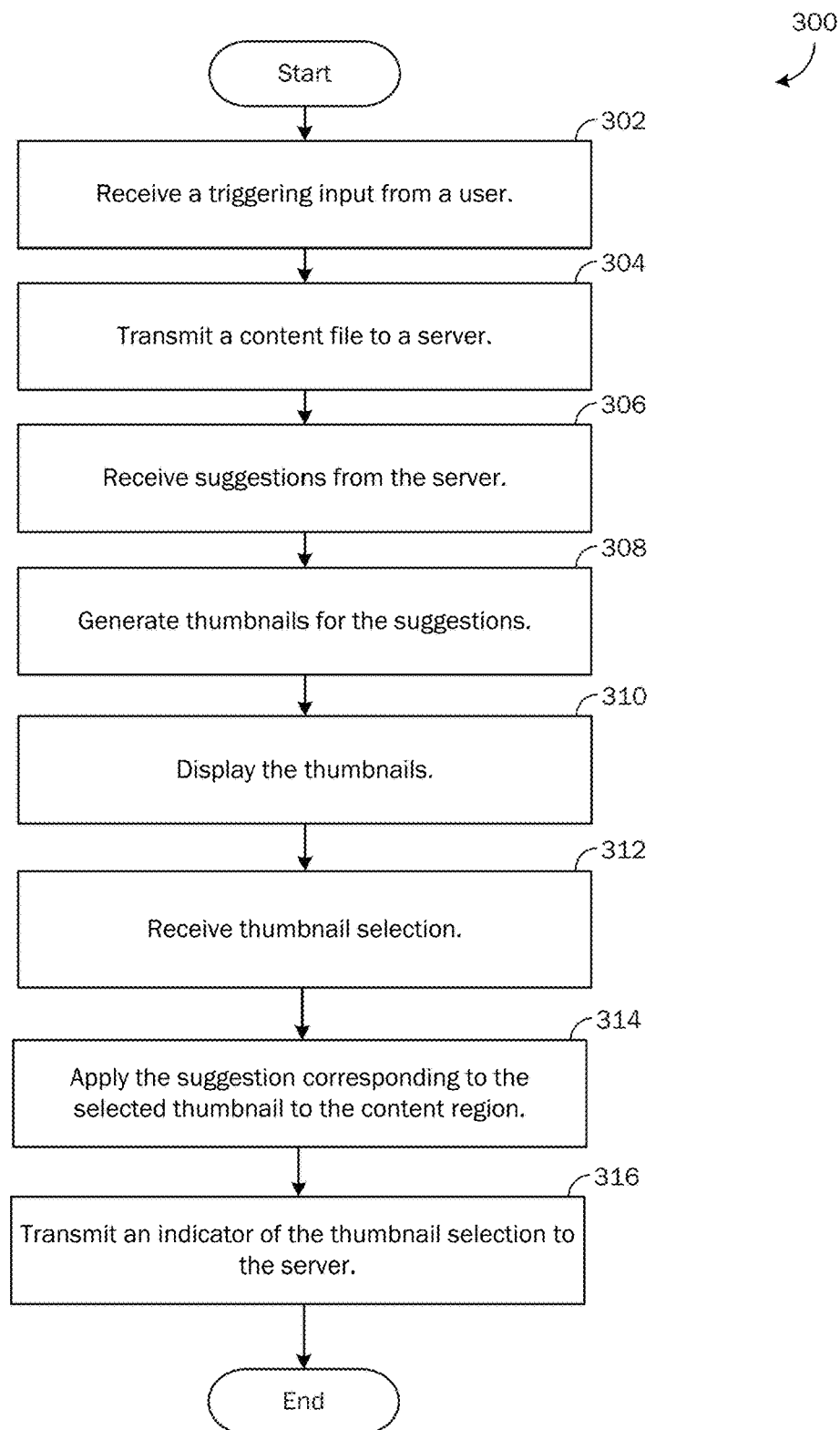
FIG. 3 illustrates a method for using suggestions to arrange a content file performed by aspects of the content editor of FIG. 1.

FIG. 3 illustrates a method 300 for using suggestions to arrange a content file. As an example, the method 300 may be executed by a component of an exemplary system such as the system 100. For example, the method 300 may be performed by the content editor 106 to receive and use suggestions from the suggestion service 108. In examples, the method 300 may be executed on a device comprising at least one processor configured to store and execute operations, programs, or instructions.

At operation 302, a triggering input is received from a user. Various aspects include various types of triggering inputs. An example triggering input is an image being inserted into a content region of a content file. Another example triggering input is another type of content element being inserted into a content region of a content file. Yet another example of a triggering input is a user actuating a user actuatable control (e.g., a button or menu option to request suggestions). Further, in some aspects, any modification to the content, including the arrangement of the content, within a content file is a triggering event.

At operation 304, the content file is transmitted to the server computing device 104. In some aspects, the entire content file is transmitted. In other aspects, a portion of the content file is transmitted such as the content region (e.g., a slide, a page, a sheet) that was affected by the triggering event. Because many triggering events may occur while a content file is being edited, some aspects transmit to the server computing device 104 only the portions of the content file that have changed since the content file was previously sent to server computing device 104 (e.g., a prior triggering event).

At operation 306, suggestions are received from the server computing device 104. The suggestions may be generated by the suggestion service 108. Various numbers of suggestions may be received. In some aspects, the suggestion service 108 determines a number of suggestions to return to the content editor 106. For example, the suggestion service 108 may return a predetermined number of suggestions. Additionally or alternatively, the suggestion service 108 may return suggestions that exceed a predetermined relevance threshold (e.g., based on a calculated score for relevance or suitability for the content region and/or content file). Additionally, in some aspects, the content editor 106 specifies a number of suggestions to return. Additionally, the server may not return any suggestions if the suggestion service 108 is unable to generate any relevant suggestions.

In one example, the received suggestions comprise lists of actions to perform on the content region to arrange the content elements in accordance with the suggestion. In other aspects, the received suggestions may comprise content files or partial content files containing the content region the suggestion pertains to.

At operation 308, thumbnails are generated for the suggestions. In some aspects, the thumbnails are generated by applying the list of actions to a copy of the content region and then generating an image of the updated copy of the content region. Alternatively, if the received suggestions comprise updated content regions, the updated content regions may be rendered and used to generate images.

At operation 310, the generated thumbnails are displayed. In some aspects, thumbnails for all of the received suggestions are displayed. In other aspects, thumbnails for a portion of the suggestions are displayed. For example, a slider or other type of user-actuatable control may be provided to allow a user to request that thumbnails for additional suggestions be displayed.

At operation 312, a thumbnail selection is received. For example, the selection may be received when a user touches, swipes, clicks, or double-clicks on one of the thumbnails. In other aspects, a user may indicate a selection by actuating a user interface element.

At operation 314, the suggestion corresponding to the selected thumbnail is applied to the content region of the content file. By applying the suggestion to the content region, the content region is arranged in accordance with the suggestion. In some aspects, the content elements from the suggestions are copied or merged into the content region. Additionally or alternatively, a series of actions are applied to the content region to transform the content region to match the selected thumbnail.

At operation 316, an indication of the selection is sent to the server computing device 104. The server computing device 104 may store this information to generate usage statistics for the suggestions. As mentioned previously, the suggestions may be generated using blueprints. In some aspects, the usage statistics are generated for the blueprints. Additionally, in some aspects the usage statistics are generated for subsets of the received content files based on properties of the content file. For example, the statistics may separately track selections for content regions that include a bulleted list and content regions that include a paragraph of text. Additionally, the statistics may be calculated in a manner that incorporates information about the user. For example, statistics may be generated for a specific user, multiple users who are associated with a particular organization, or users who are associated with a certain region. The usage statistics may be used by the suggestion service 108 to adjust the model used for selecting blueprints for use in generating suggestions.

In some aspects, once a thumbnail is selected and applied to a content region, the other thumbnails are no longer displayed. Alternatively, the other thumbnails remain visible after the selection is received so that a user may change the selection.

Figure 4:
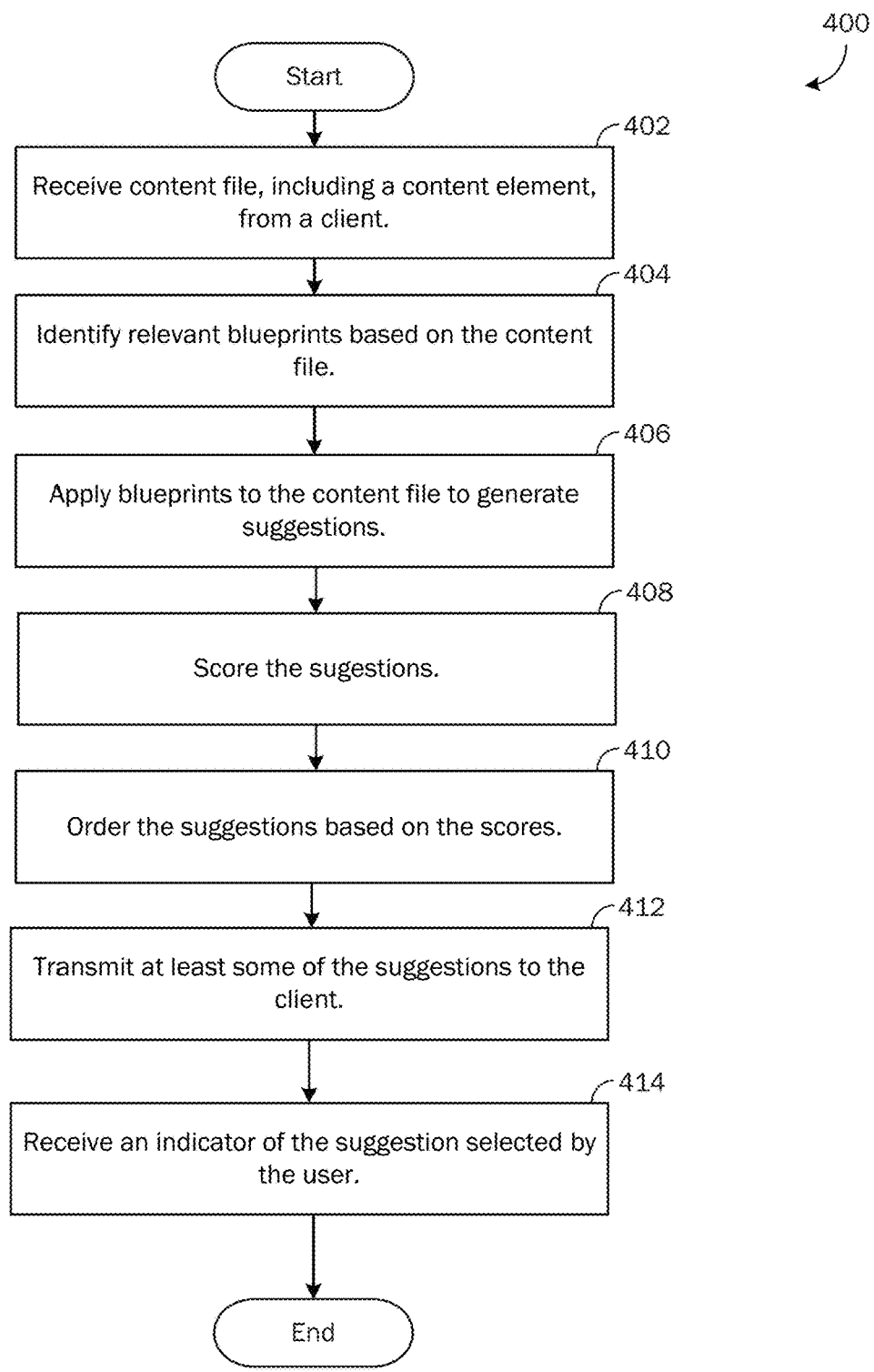
FIG. 4 illustrates a method for generating suggestions for a content file performed by aspects of the suggestion service of FIG. 1.

FIG. 4 illustrates a method 400 for generating suggestions for a content file. As an example, the method 400 may be executed by a component of an exemplary system such as the system 100. For example, the method 400 may be performed by the suggestion service 108 to generate and transmit suggestions to the content editor 106. In examples, the method 400 may be executed on a device comprising at least one processor configured to store and execute operations, programs, or instructions.

At operation 402, a content file, including a content element, is received from a client such as the user computing device 102. In some aspects, the entire content file is received. In other aspects, a content region containing the content element is received. Additionally, in some aspects, the content element is identified as being recently added to the content region. The content element may be disposed in an initial position within the content region such as overlaying and occluding other previously added content elements. Further, in some aspects, the content element may be added, but not yet positioned within the content region.

At operation 404, relevant blueprints are identified based on the content file and the content elements therein. Various factors may be used to determine that a blueprint is relevant. For example, relevant blueprints may be associated with or compatible with a theme that has been applied to the content region. Additionally, relevant blueprints may include placeholders that correspond well to the content elements on the slide (e.g., the same number of placeholders as content elements, placeholders with compatible dimensions, etc.). Additionally, a blueprint may be identified as relevant based on matching a determined property of a content element of the content file (e.g., a particular blueprint may be more appropriate for content elements that include images of charts).

At operation 406, the identified relevant blueprints are applied to the content file to generate suggestions. In some aspects, the content elements of the content region are mapped to placeholder content elements in the blueprint. For example, a title text within the content file may be mapped to the title placeholder in the blueprint. Similarly, an image content element from the content region may be mapped to an image placeholder. Depending on the dimensions of the image and the placeholder, the image may be cropped or resized to fit the placeholder. Additionally, the image may be positioned so that a salient region of the image is disposed within an identified focus area on the blueprint.

At operation 408, the generated suggestions are scored. In some examples, the suggestions are scored based on a predicted likelihood that the suggestion would be selected. The scores may be based on a variety of factors. For example, blueprints that are associated with the same theme as the content region may be scored higher than otherwise equal blueprints that are not associated with the same theme as the content region. Additionally, blueprints that require less modification (e.g., cropping or resizing) of the content elements included in the content region may be scored higher than blueprints that require more modification. A blueprint that has a defined focus region that aligns with a salient region of an image content element from the content region may score higher than a blueprint that does not include a focus area or a blueprint that includes a focus area that does not align well with a salient region of a content element of the content region. Additionally, the score may be based on a popularity of the blueprint with the user, an organization the user is associated with, or the general public (e.g., as determined by previous selections). Further, the score may be based on similarity between the blueprint and other blueprints that have been previously applied to other content regions of the content file.

At operation 410, the suggestions are ordered based on the scores. At operation 412, at least some of the suggestions (e.g., the highest scoring suggestions) are transmitted to the content editor 106. The suggestions may be transmitted in a number of ways. For example, the suggestions may be transmitted as multiple lists of steps that when applied will transform the content region according to the suggestion. Alternatively, the suggestions may be transmitted as an updated content region that has had the suggestion applied.

At operation 414, an indicator of the suggestion selected by the user is received. For example, the content editor 106 may transmit a message containing an indicator of the user's selection choice. As described previously, the selection may be stored and used to generate usage statistics that may be used to improve the way suggestions are generated in response to future requests.

Figure 5:
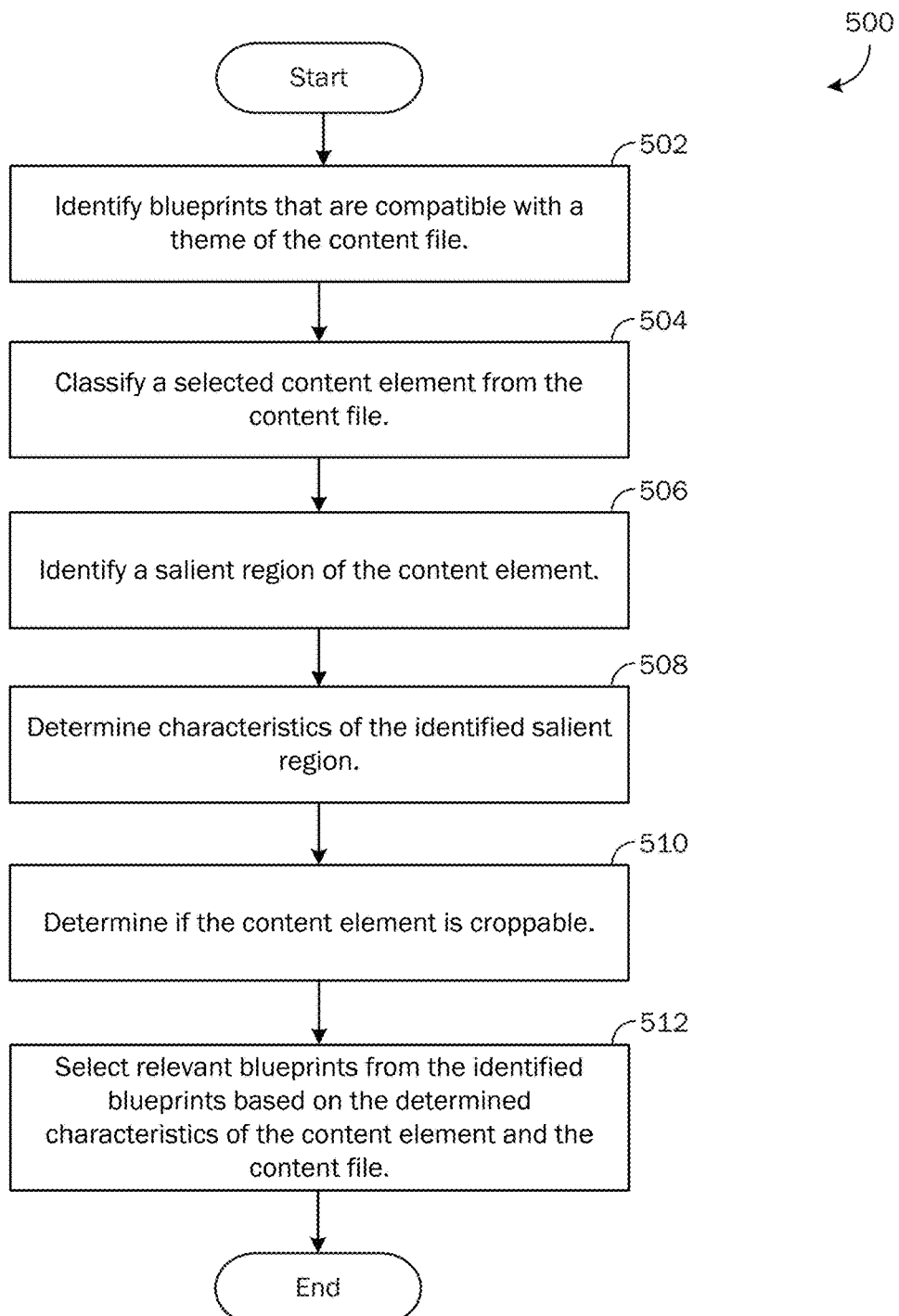
FIG. 5 illustrates a method for identifying relevant blueprints for a content file performed by aspects of the suggestion service of FIG. 1.

FIG. 5 illustrates a method 500 for identifying relevant blueprints for a content file. As an example, the method 500 may be executed by a component of an exemplary system such as the system 100. For example, the method 500 may be performed by the suggestion service 108 to generate and transmit suggestions to the content editor 106. In examples, the method 500 may be executed on a device comprising at least one processor configured to store and execute operations, programs, or instructions.

At operation 502, blueprints that are compatible with a theme of the content file are identified. In some aspects, a theme comprises a pattern for a slide or group of slides and may include layout elements (e.g., placeholders for titles, headers, lists, footers, and other types of content), colors, fonts, shapes, images, and background styles and images. A theme may be applied to all content regions within a content file or a subset of the content regions. Some content files may include multiple themes such that different content regions are associated with different themes.

In aspects, blueprints may be theme-specific or generally applicable. Theme-specific blueprints are designed for one or more particular themes. Generally-applicable blueprints are designed to be compatible with any or nearly any theme. In some aspects, the blueprints include metadata that identify whether the blueprint is theme-specific and further which themes the blueprint is compatible with. In some aspects, when the blueprint is stored using an existing format for a content file, the metadata are stored in and extracted from text fields in the blueprint files (e.g., a notes field associated with a content file or a content region in the content file). Additionally, in some aspects, when the blueprints are stored using an existing format for content files, the blueprints can have a theme applied in a similar manner to any other content file. In some aspects, blueprints are identified by searching for blueprints that include metadata indicating that the blueprint is associated with the theme of the content region. In aspects, depending on how many theme-specific blueprints are identified, generally-applicable blueprints may be identified as well. Additionally, in some aspects, blueprints are identified by searching for blueprints having the same theme as or a similar theme to the theme of the content region for which suggestions are being generated.

In some aspects, the suggestion service 108 may use a table or index to identify blueprints that are compatible with particular themes. In these aspects, the suggestion service 108 queries the table or index for blueprints compatible with the theme of the content region for which suggestions are being generated. Additionally or alternatively, the blueprints may be organized in a hierarchical structure such as a directory structure that indicates the themes with which the blueprints are compatible (e.g., a first directory containing blueprints that are compatible with a first theme, a second directory containing blueprints that are compatible with a second theme, and third directory containing blueprints that are generally applicable, etc.). In these aspects, the blueprints may be identified by determining an appropriate directory and identifying the blueprints contained therein.

At operation 504, a content element from the content region for which suggestions are being generated is classified. For example, the content element may be an image that has recently been added to the content region. In some aspects, multiple content elements may be classified. Classifying the content element may comprise determining its content type, such as whether it is a photograph or graphic (e.g., a chart, clip art, screenshot, etc.). In later operations, the results of this classification may be used to select appropriate blueprints. For example, some blueprints may fit well with a chart, while others may not. Various techniques may be used to classify the content element. For example, for an image content element, image processing techniques may be used to analyze some or all of the pixels of the image to classify the content element. In some aspects, the content element may include metadata that is indicative of a content type (e.g., an image that includes metadata specifying a camera make and model may be indicative of the image being a photograph).

At operation 506, the salient region of the content element is identified. In some aspects, the salient region comprises a portion of the content element that is most important (e.g., most prominent or noticeable). For example, a face may be identified as a salient region of an image of a person. The salient region may comprise a single contiguous region. Alternatively, the salient region may comprise multiple contiguous regions. Various techniques may be used to identify the salient region. For example, facial recognition techniques may be used to identify a portion of an image containing a face. Other techniques may be used as well, such as by identifying regions of high contrast or high variation, regions containing text, foreground regions, etc.

At operation 508, characteristics of the identified salient region are determined. For example, in some aspects, the height, width, and aspect ratio of the salient region are determined. Further, other aspects may determine other characteristics of the salient region as well.

At operation 510, it is determined whether the content element is croppable. For example, a content element may be croppable if it is determined that a portion of the content element can be removed (or hidden). The image may be cropped to remove an outer portion, such as a horizontal strip along the top or bottom of the image or a vertical strip along one of the sides. In some aspects, a content element is determined to be croppable based on metadata associated with the image or a setting/parameter specified by the content editor 106. Additionally, in some aspects, a content element is determined to be croppable if it is a photograph and a portion of the content element can be removed without affecting an identified salient region.

At operation 512, relevant blueprints are selected from the identified blueprints based on the determined characteristics of the content element and the content file. For example, blueprints that have a content element placeholder of the same or similar size to the content element may be selected. Additionally, if the content element is croppable, additional blueprints having content element placeholders that have a size that the content element can be cropped to fit may be selected as well. In some aspects, the amount of text or presence of a bulleted list may also be used in selecting blueprints from the identified blueprints. In various aspects, various numbers of blueprints are selected.

Figure 6:
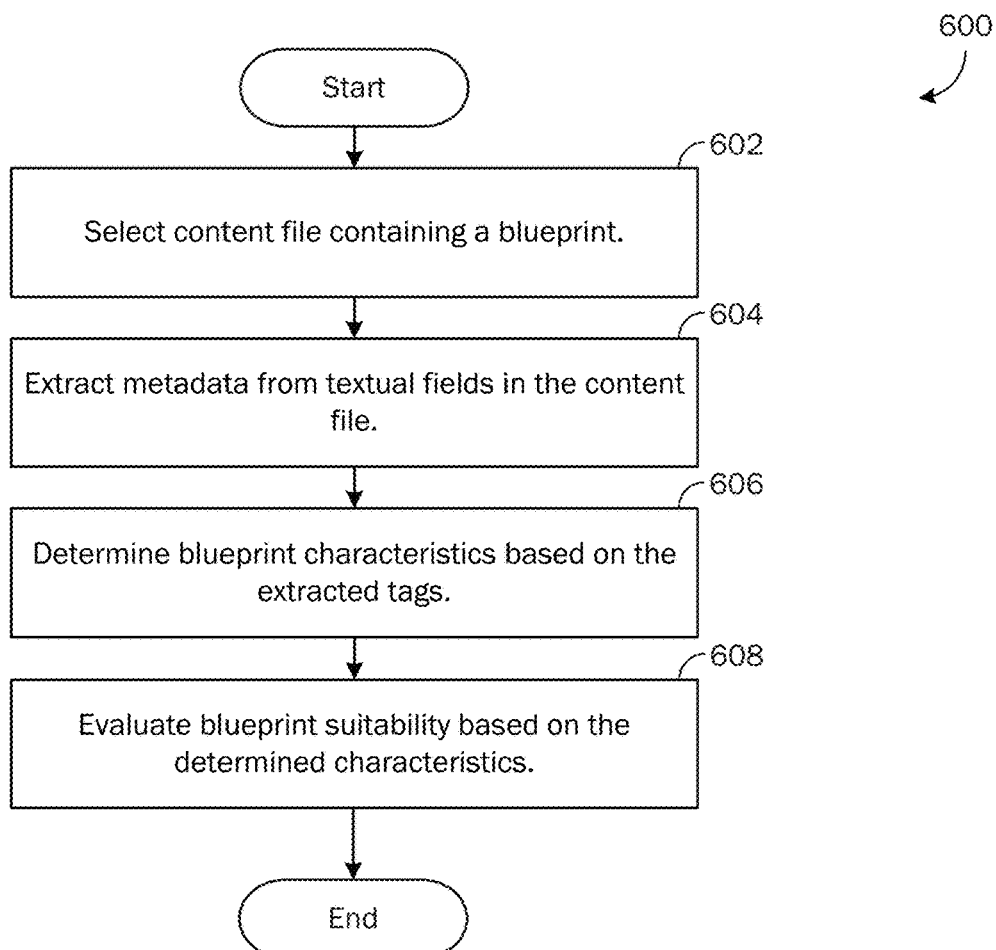
FIG. 6 illustrates a method for determining characteristics of a blueprint stored in a content file performed by aspects of the suggestion service of FIG. 1.

FIG. 6 illustrates a method 600 for determining characteristics of a blueprint stored in a content file. As an example, the method 600 may be executed by a component of an exemplary system such as the system 100. For example, the method 600 may be performed by the suggestion service 108 to determine properties of a blueprint for potential use in generating suggestions. In examples, the method 600 may be executed on a device comprising at least one processor configured to store and execute operations, programs, or instructions.

At operation 602, a content file containing a blueprint is selected. At operation 604, metadata are extracted from textual fields in the selected content file. Example textual fields include a notes field that is configured to store notes about a content region in the content file and an alternate text field that is configured to store accessibility information about an image, shape, or other placeholder content element. These are just examples, and metadata may be extracted from other textual fields as well. In some aspects, the suggestion service 108 iterates through at least some of the content elements in the blueprint to determine whether metadata are being stored in a textual field associated with the content element.

At operation 606, characteristics of the blueprint are determined from the extracted metadata. The metadata may be embedded at a content region level (e.g., slide level in a presentation content element) or at a placeholder level (e.g., associated with a content element such as a shape or image positioned in the content region). At the content region level, example metadata include an identifier that can be used to refer to the blueprint. Additional metadata may indicate whether a newly added content element should be inserted as a background of the content region. The metadata may also include instructions that can be applied to some or all of the content in the blueprint. For example, the instructions may indicate to overlay or place some or all of the elements in a blueprint over a content element. As an example, the instruction in the blueprint may cause a suggestion to be generated that positions the newly added content element as a full-sized background and then overlays various shapes from the blueprint (or a template associated with either the blueprint or the content region) over the content element. Alternatively, the instructions in the blueprint may cause one shape (e.g., a logo) or a portion of the shapes in the blueprint to be overlaid on top of the newly added content element. Some blueprints may also have instructions that apply only to content regions that include particular elements (e.g., a page number).

At the placeholder level, metadata may identify whether a content element should be inserted into the placeholder or whether the placeholder corresponds to a focus region. As an example, the focus region may be disposed over another placeholder (or background) that is configured to receive a content element. The focus region may then specify where the focus of the content element should be positioned. For example, the salient region (e.g., a face) of a content element may be aligned with the focus region placeholder. Metadata may also specify whether the content element can be cropped, resized, or otherwise modified to fit the placeholder or content region and how the content element should be aligned within the placeholder (e.g., if the content element is smaller than the placeholder). The alignment metadata may specify to center a content element, tile a content element, or align the content element with a corner of the placeholder (e.g., in the top right corner). As yet another example, some blueprints may include design elements such as shapes or lines that will be retained in suggestions (i.e., the design elements are not placeholders for other content). Some blueprints include instructions to set a color value for the design element that is extracted from the newly added content image. Other aspects may include metadata that define other characteristics of the blueprint as well. In some aspects, the metadata comprise key value pairs in a defined format such as extensible markup language (XML). In at least some aspects, the placeholders have dimensions (e.g., a height and width) and are disposed in a particular location within the content region.

At operation 608, the suitability of a blueprint may be evaluated based on the characteristics determined from the metadata. For example, the size of a placeholder region may be compared to the size of a newly added content element that needs to be positioned within the content region in any suggestions that are generated. If the placeholder dimensions match the size of a newly added content element, the blueprint may be determined to be suitable. Alternatively, if the dimensions of the placeholder are smaller than the dimensions of the newly added content element, but the content element can be cropped to fit the placeholder, the blueprint may be determined to be suitable. Additionally, if a content element can be positioned in a background position or placeholder so that a salient region is aligned with a focus region placeholder, the blueprint may be determined to be suitable. Conversely, if some of the conditions described in the above examples are not met, it may be determined that the blueprint is less suitable for the particular content file and content element. Additionally, the number of placeholders in a blueprint may be compared to the number of content elements in the content file. If the numbers match, the blueprint may be determined to be more suitable than if the numbers do not match.

Figure 7:
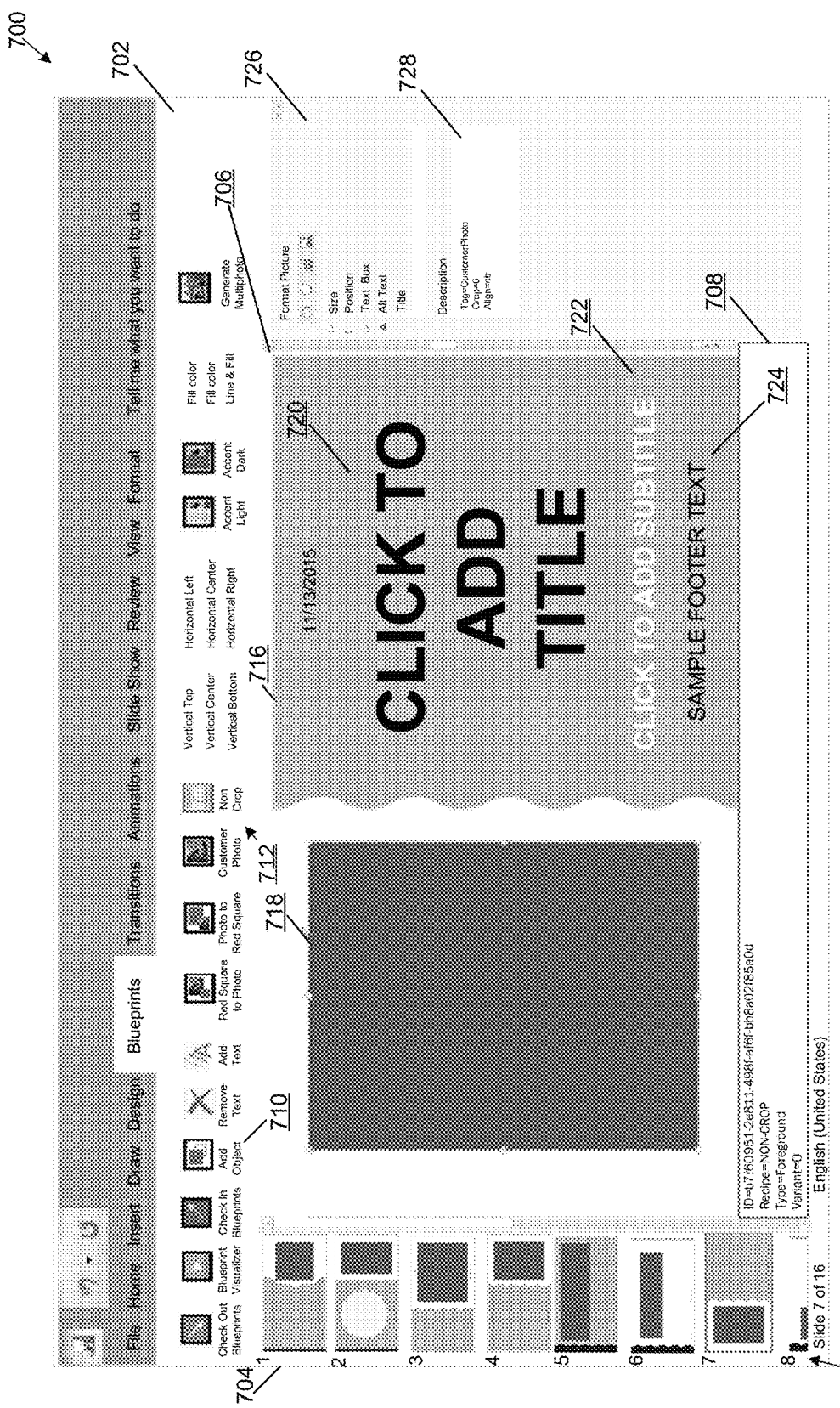
FIG. 7 illustrates an example user interface screen generated by aspects of the content editor of FIG. 1.

FIG. 7 illustrates an example user interface screen 700 generated by aspects of the content editor 106 and displayed by the user computing device 102. In this example, the screen 700 is generated by the content editor to create and edit a content file containing blueprints for use by the suggestion service 108.

The screen 700 includes a toolbar area 702, a blueprint thumbnail display area 704, a blueprint display area 706, a metadata display area 708, and an object properties display area 726. Other aspects may include fewer, additional, or different components areas.

The toolbar area 702 operates to provide user interface elements to select tools and perform commands related to creating and editing blueprints in a content file. In some aspects, the content editor 106 displays the toolbar area 702 when a user creates or loads a blueprint but not when the user loads or creates an ordinary content file. As shown in this example, the toolbar area 702 includes, among others, an add object control 710 and a placeholder settings control panel 712.

The add object control 710 operates to add new objects such as placeholders to a blueprint. In some aspects, when a user actuates the add object control 710, the content editor 106 generates a drop down menu that provides additional commands for adding an object. Once the object is added, the user may drag the object into position with, for example, a touch or a click (e.g., with a mouse, touchpad, etc.).

In some aspects, the placeholder settings control panel 712 includes a plurality of controls to adjust characteristics of a placeholder. For example, when a user selects a placeholder (e.g., by touching or clicking the placeholder in the blueprint display area 706), the controls on the placeholder settings control panel 712 are activated and, when actuated by a user, the suggestion service 108 adjusts the characteristics of the selected placeholder accordingly. Example controls include a content element control that indicates that the placeholder should receive a user content element (e.g., a photo) included in the content file, a non-crop control that toggles whether a user content element inserted over the placeholder should be cropped, and various alignment controls that specify how the user content element should be aligned vertically (e.g., top, center, bottom) and horizontally (e.g., left, center, right).

The blueprint thumbnail display area 704 includes a list 714 of thumbnail images of blueprints stored in the content file. In the example shown, all of the blueprints in the list 714 are associated with a common theme. In other aspects, some of the blueprints are associated with different themes. In some aspects, the thumbnails are user actuatable and, when actuated, select the associated blueprint. Upon selection, the blueprint may be shown in the blueprint display area 706 where the blueprint may be edited.

The blueprint display area 706 operates to display one or more content regions that are configured as blueprints from a content file. In this example, the blueprint display area 706 displays a content region 716 that is configured to be a blueprint. In this example the content region 716 includes a placeholder 718, a title region 720, a subtitle region 722, and a footer region 724. Other aspects include additional or different elements. For example, in some aspects, the blueprint may also include images or shapes that are not placeholders, but instead are retained as design elements in the suggestions. In some aspects, the presence or absence of tags is used to distinguish placeholders from these design elements.

In some aspects, a user can interact with and modify the blueprint that is displayed by adding, removing, repositioning, or otherwise modifying various content elements of the blueprint. In some aspects, the blueprint display area 706 operates to allow a user to modify the blueprint in much the same way the user would modify any other content region of a content file.

The metadata display area 708 operates to display metadata associated with the blueprint. Further, in some aspects, the metadata display area 708 also displays metadata associated with a content element of the blueprint such as a placeholder (e.g., in aspects that do not include the object properties display area 726). In some aspects, the metadata are extracted from a textual field (e.g., a notes field or an alternate text field) of the content region 716. In some aspects, the metadata shown in the metadata display area 708 are updated based on which, if any, content element is selected by the user.

The object properties display area 726 operates to display metadata associated with a selected content element of the blueprint such as a placeholder. In this example, the object properties display area 726 is displaying properties of the placeholder 718, which is shown as being selected. In some aspects, the object properties display area 726 includes an object metadata display area 728. In this example, the object metadata display area 728 is displaying metadata stored in the alternate text description field of the placeholder 718.

Figure 8:
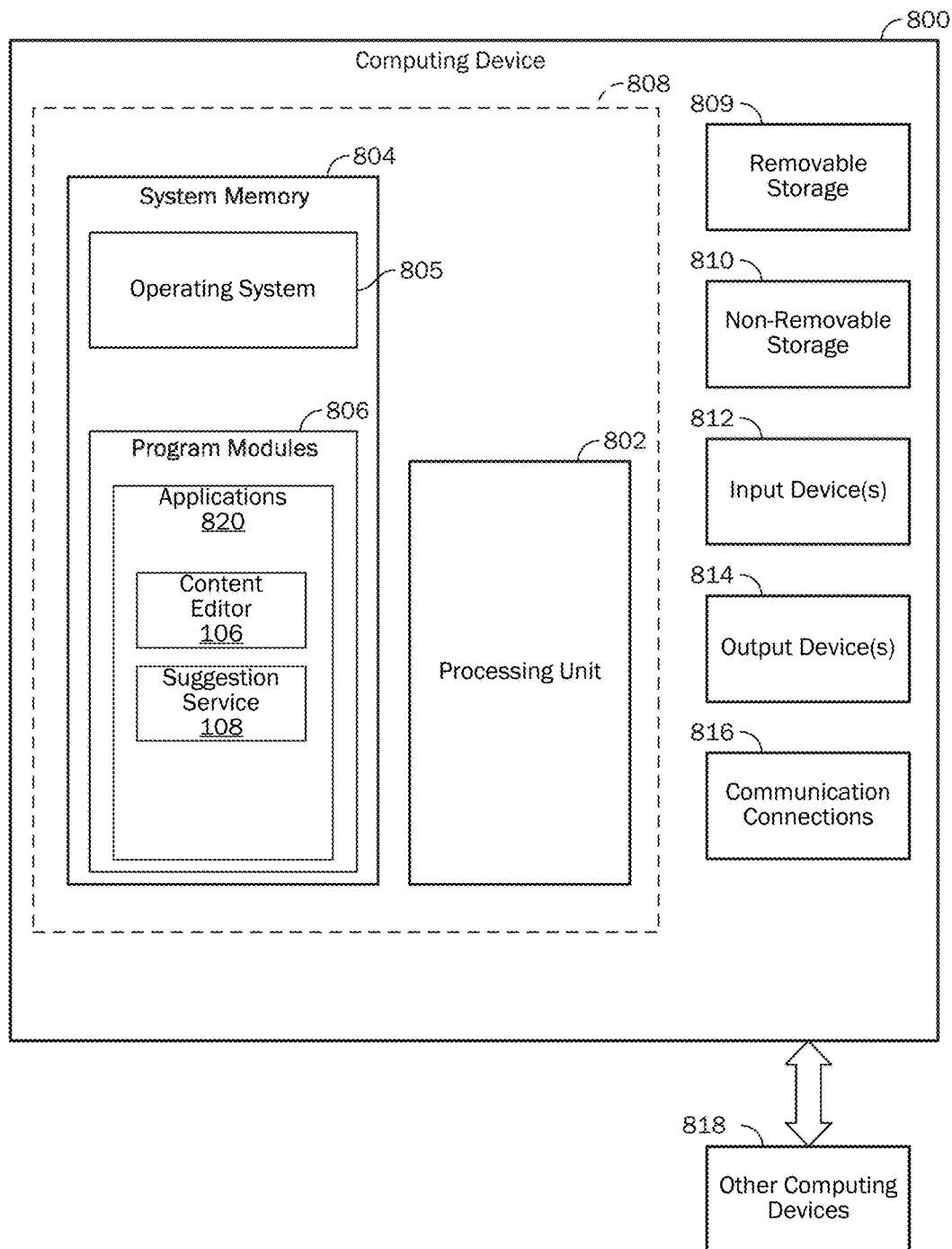
FIG. 8 is a block diagram illustrating example physical components of a computing device with which aspects of the invention may be practiced.
Figure 9A:
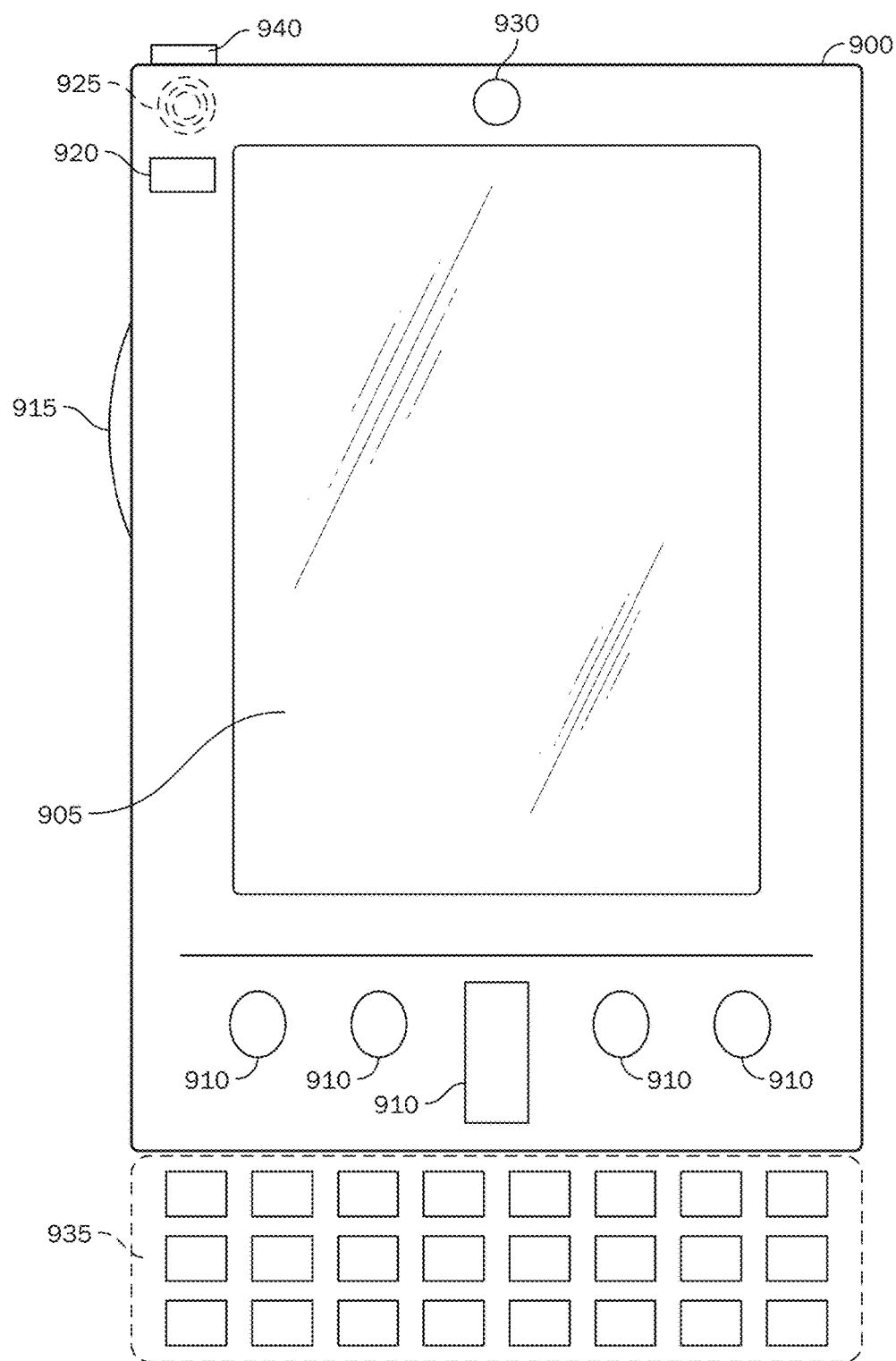
FIGS. 9A and 9B are block diagrams of a mobile computing device with which aspects of the present invention may be practiced.
Figure 9B:
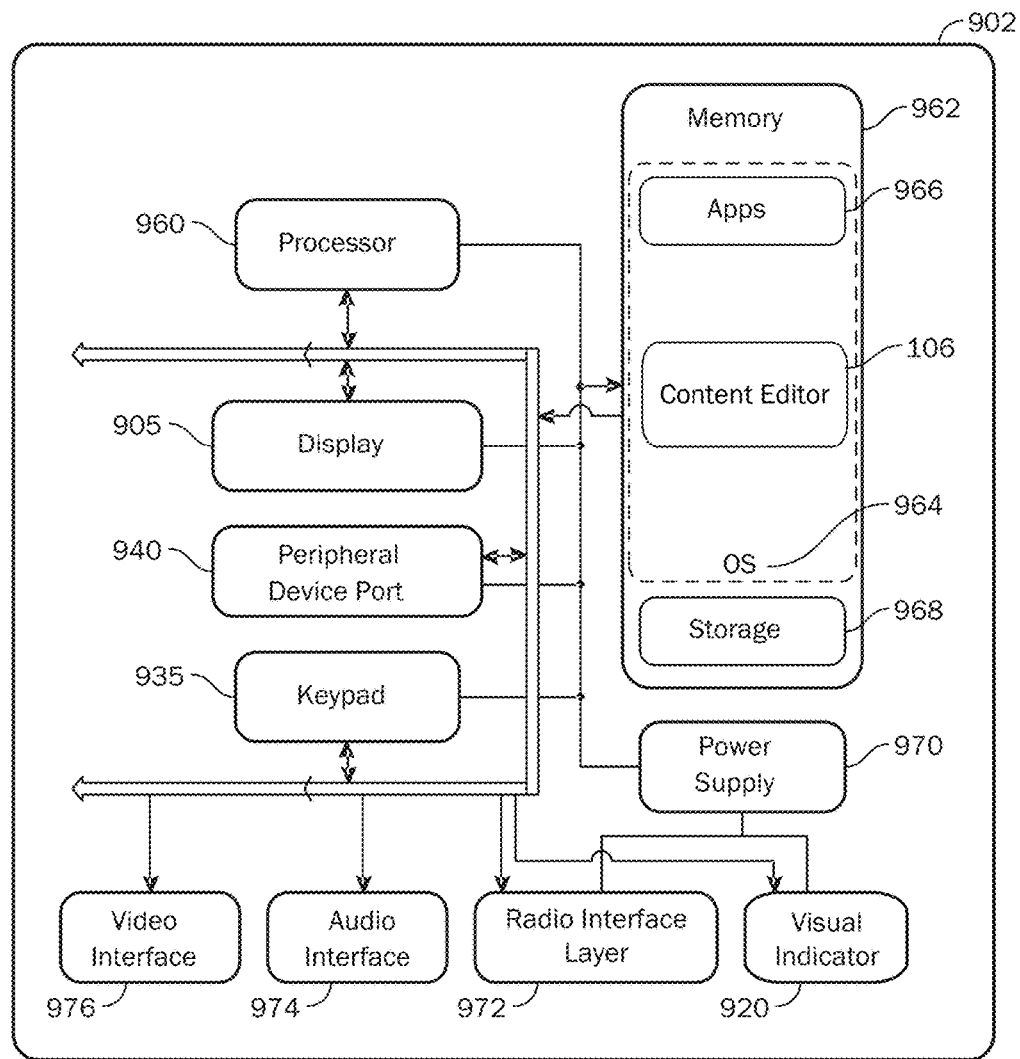
Figure 10:
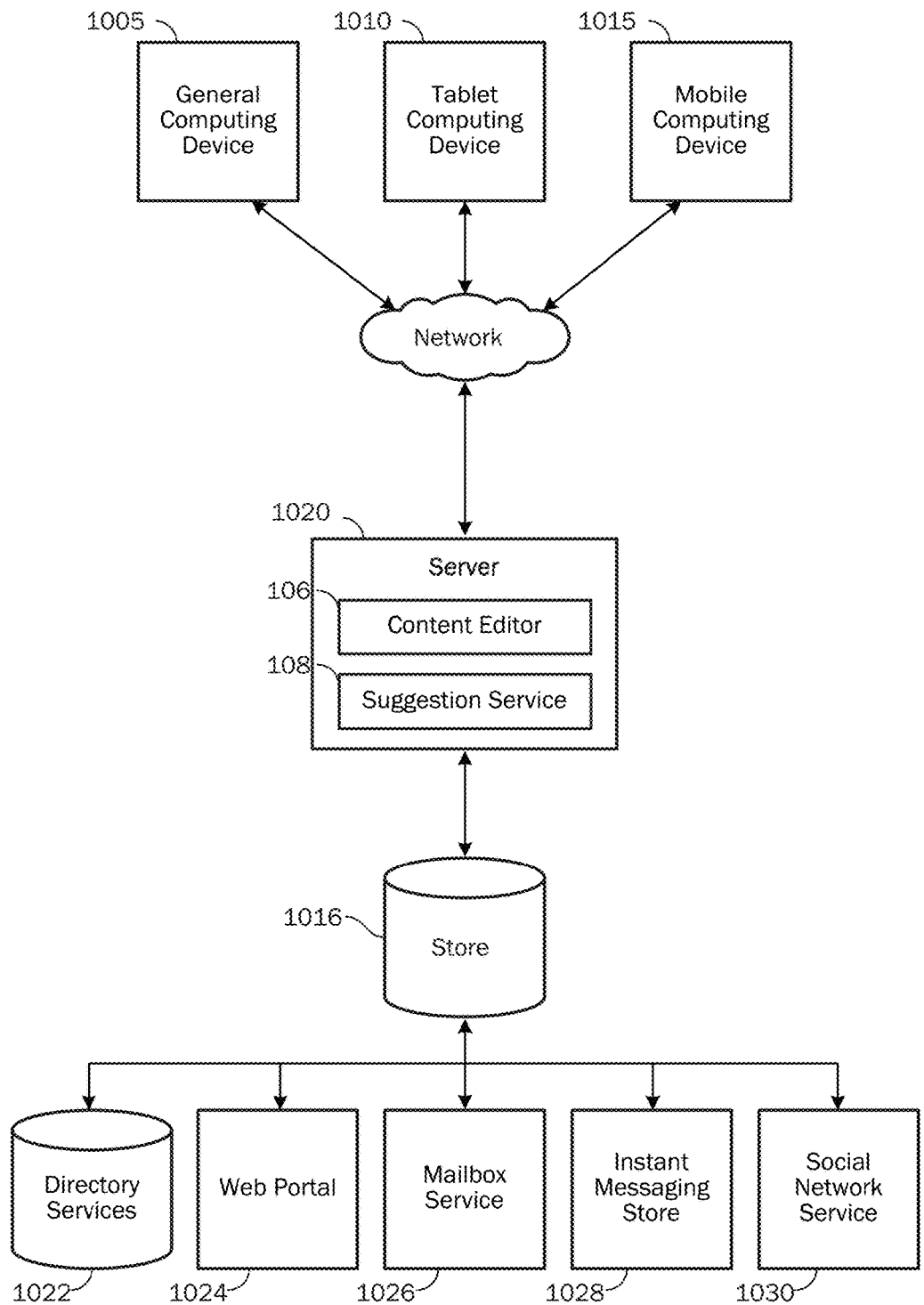
FIG. 10 is a block diagram of a distributed computing system in which aspects of the present invention may be practiced.

FIGS. 8-10 and the associated descriptions provide a discussion of a variety of operating environments in which aspects of the invention may be practiced. However, the devices and systems illustrated and discussed with respect to FIGS. 8-10 are for purposes of example and illustration and are not limiting of a vast number of computing device configurations that may be used for practicing aspects of the invention, described herein.

FIG. 8 is a block diagram illustrating physical components (i.e., hardware) of a computing device 800 with which aspects of the invention may be practiced. The computing device components described below may be suitable for the user computing device 102 and the server computing device 104. In a basic configuration, the computing device 800 may include at least one processing unit 802 and a system memory 804. Depending on the configuration and type of computing device, the system memory 804 may comprise, but is not limited to, volatile storage (e.g., random access memory), non-volatile storage (e.g., read-only memory), flash memory, or any combination of such memories. The system memory 804 may include an operating system 805 and one or more program modules 806 suitable for running software applications 820 such as the content editor 106 and the suggestion service 108. The operating system 805, for example, may be suitable for controlling the operation of the computing device 800. Furthermore, aspects of the invention may be practiced in conjunction with a graphics library, other operating systems, or any other application program and is not limited to any particular application or system. This basic configuration is illustrated in FIG. 8 by those components within a dashed line 808. The computing device 800 may have additional features or functionality. For example, the computing device 800 may also include additional data storage devices (removable and/or non-removable) such as, for example, magnetic disks, optical disks, or tape. Such additional storage is illustrated in FIG. 8 by a removable storage device 809 and a non-removable storage device 810.

As stated above, a number of program modules and data files may be stored in the system memory 804. While executing on the processing unit 802, the program modules 806 (e.g., the content editor 106) may perform processes including, but not limited to, one or more of the stages of the methods 300-600 illustrated in FIGS. 3-6. Other program modules that may be used in accordance with aspects of the present invention may include electronic mail and contacts applications, word processing applications, spreadsheet applications, database applications, slide presentation applications, drawing or computer-aided application programs, etc.

Furthermore, aspects of the invention may be practiced in an electrical circuit comprising discrete electronic elements, packaged or integrated electronic chips containing logic gates, a circuit utilizing a microprocessor, or on a single chip containing electronic elements or microprocessors. For example, aspects of the invention may be practiced via a system-on-a-chip (SOC) where each or many of the components illustrated in FIG. 8 may be integrated onto a single integrated circuit. Such an SOC device may include one or more processing units, graphics units, communications units, system virtualization units and various application functionality all of which are integrated (or "burned") onto the chip substrate as a single integrated circuit. When operating via an SOC, the functionality, described herein, with respect to the content editor 106 or suggestion service 108 may be operated via application-specific logic integrated with other components of the computing device 800 on the single integrated circuit (chip). Aspects of the invention may also be practiced using other technologies capable of performing logical operations such as, for example, AND, OR, and NOT, including but not limited to mechanical, optical, fluidic, and quantum technologies. In addition, aspects of the invention may be practiced within a general purpose computer or in any other circuits or systems.

The computing device 800 may also have one or more input device(s) 812 such as a keyboard, a mouse, a pen, a sound input device, a touch input device, etc. The output device(s) 814 such as a display, speakers, a printer, etc. may also be included. The aforementioned devices are examples and others may be used. The computing device 800 may include one or more communication connections 816 allowing communications with other computing devices 818. Examples of suitable communication connections 816 include, but are not limited to, radio frequency (RF) transmitter, receiver, and/or transceiver circuitry; universal serial bus (USB), parallel, and/or serial ports.

The term computer readable media as used herein may include computer storage media. Computer storage media may include volatile and nonvolatile, removable and non-removable media implemented in any method or technology for storage of information, such as computer readable instructions, data structures, or program modules. The system memory 804, the removable storage device 809, and the non-removable storage device 810 are all computer storage media examples (i.e., memory storage.) Computer storage media may include RAM, ROM, electrically erasable read-only memory (EEPROM), flash memory or other memory technology, CD-ROM, digital versatile disks (DVD) or other optical storage, magnetic cassettes, magnetic tape, magnetic disk storage or other magnetic storage devices, or any other article of manufacture which can be used to store information and which can be accessed by the computing device 800. Any such computer storage media may be part of the computing device 800. Computer storage media does not include a carrier wave or other propagated or modulated data signal.

Communication media may be embodied by computer readable instructions, data structures, program modules, or other data in a modulated data signal, such as a carrier wave or other transport mechanism, and includes any information delivery media. The term "modulated data signal" may describe a signal that has one or more characteristics set or changed in such a manner as to encode information in the signal. By way of example, and not limitation, communication media may include wired media such as a wired network or direct-wired connection, and wireless media such as acoustic, radio frequency (RF), infrared, and other wireless media.

FIGS. 9A and 9B illustrate a mobile computing device 900, for example, a mobile telephone, a smart phone, a tablet personal computer, a laptop computer, and the like, with which aspects of the invention may be practiced. With reference to FIG. 9A, one aspect of a mobile computing device 900 for implementing the aspects is illustrated. In a basic configuration, the mobile computing device 900 is a handheld computer having both input elements and output elements. The mobile computing device 900 typically includes a display 905 and one or more input buttons 910 that allow the user to enter information into the mobile computing device 900. The display 905 of the mobile computing device 900 may also function as an input device (e.g., a touch screen display). If included, an optional side input element 915 allows further user input. The side input element 915 may be a rotary switch, a button, or any other type of manual input element. In alternative aspects, mobile computing device 900 may incorporate more or less input elements. For example, the display 905 may not be a touch screen in some aspects. In yet another alternative aspect, the mobile computing device 900 is a portable phone system, such as a cellular phone. The mobile computing device 900 may also include an optional keypad 935. Optional keypad 935 may be a physical keypad or a "soft" keypad generated on the touch screen display. In various aspects, the output elements include the display 905 for showing a graphical user interface (GUI), a visual indicator 920 (e.g., a light emitting diode), and/or an audio transducer 925 (e.g., a speaker). In some aspects, the mobile computing device 900 incorporates a vibration transducer for providing the user with tactile feedback. In yet another aspect, the mobile computing device 900 incorporates input and/or output peripheral device ports 940, such as an audio input (e.g., a microphone jack), an audio output (e.g., a headphone jack), and a video output (e.g., a HDMI port) for sending signals to or receiving signals from an external device.

FIG. 9B is a block diagram illustrating the architecture of one aspect of a mobile computing device. That is, the mobile computing device 900 can incorporate a system (i.e., an architecture) 902 to implement some aspects. In one aspect, the system 902 is implemented as a "smart phone" capable of running one or more applications (e.g., browsers, e-mail applications, calendaring applications, contact managers, messaging clients, games, and media clients/players). In some aspects, the system 902 is integrated as a computing device, such as an integrated personal digital assistant (PDA) and wireless phone.

The system includes a processor 960. One or more application programs 966 may be loaded into the memory 962 and run on or in association with the operating system 964 using the processor 960. Examples of the application programs include phone dialer programs, e-mail programs, personal information management (PIM) programs, word processing programs, spreadsheet programs, Internet browser programs, messaging programs, and so forth. The system 902 also includes a non-volatile storage area 968 within the memory 962. The non-volatile storage area 968 may be used to store persistent information that should not be lost if the system 902 is powered down. The application programs 966 may use and store information in the non-volatile storage area 968, such as e-mail or other messages used by an e-mail application, and the like. As should be appreciated, other applications may be loaded into the memory 962 and run on the mobile computing device 900, including the content editor 106 described herein.

The system 902 has a power supply 970, which may be implemented as one or more batteries. The power supply 970 might further include an external power source, such as an AC adapter or a powered docking cradle that supplements or recharges the batteries.

The system 902 may also include a radio 972 that performs the function of transmitting and receiving radio frequency communications. The radio 972 facilitates wireless connectivity between the system 902 and the "outside world," via a communications carrier or service provider. Transmissions to and from the radio 972 are conducted under control of the operating system 964. In other words, communications received by the radio 972 may be disseminated to the application programs 966 via the operating system 964, and vice versa.

The audio interface 974 is used to provide audible signals to and receive audible signals from the user. For example, in addition to being coupled to the audio transducer 925, the audio interface 974 may also be coupled to a microphone to receive audible input, such as to facilitate a telephone conversation. The system 902 may further include a video interface 976 that enables an operation of an on-board camera 930 to record still images, video streams, and the like.

A mobile computing device 900 implementing the system 902 may have additional features or functionality. For example, the mobile computing device 900 may also include additional data storage devices (removable and/or non-removable) such as, magnetic disks, optical disks, or tape. Such additional storage is illustrated in FIG. 9B by the non-volatile storage area 968.

Data/information generated or captured by the mobile computing device 900 and stored via the system 902 may be stored locally on the mobile computing device 900, as described above, or the data may be stored on any number of storage media that may be accessed by the device via the radio 972 or via a wired connection between the mobile computing device 900 and a separate computing device associated with the mobile computing device 900, for example, a server computer in a distributed computing network, such as the Internet. As should be appreciated such data/information may be accessed via the mobile computing device 900 via the radio 972 or via a distributed computing network. Similarly, such data/information may be readily transferred between computing devices for storage and use according to well-known data/information transfer and storage means, including electronic mail and collaborative data/information sharing systems.

FIG. 10 illustrates one aspect of the architecture of a system for generating suggestions for a content file based on blueprints, as described above. Content files developed, interacted with, or edited in association with the content editor 106 or suggestion service 108 may be stored in different communication channels or other storage types. For example, various content files may be stored using a directory service 1022, a web portal 1024, a mailbox service 1026, an instant messaging store 1028, or a social networking service 1030. The content editor 106 or suggestion service 108 may access content files using any of these types of systems or the like, as described herein. A server 1020 may provide the content editor 106 or suggestion services 108 to clients. As one example, the server 1020 may be a web server providing the content editor 106 or suggestion service 108 over the web. The server 1020 may provide the content editor 106 or suggestion service 108 over the web to clients through a network. By way of example, the client computing device may be implemented as the computing device 900 and embodied in a personal computer 1005, a tablet computing device 1010, and/or a mobile computing device 1015 (e.g., a smart phone). Any of these aspects of the client computing device 1005, 1010, 1015 may use the content editor 106 or suggestion service 108 to interact with content files stored in the store 1016.

Aspects of the present invention, for example, are described above with reference to block diagrams and/or operational illustrations of methods, systems, and computer program products according to aspects of the invention. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved.

The description and illustration of one or more aspects provided in this application are not intended to limit or restrict the scope of the invention as claimed in any way. The aspects, examples, and details provided in this application are considered sufficient to convey possession and enable others to make and use the best mode of claimed invention. The claimed invention should not be construed as being limited to any aspect, example, or detail provided in this application. Regardless of whether shown and described in combination or separately, the various features (both structural and methodological) are intended to be selectively included or omitted to produce an aspect with a particular set of features. Having been provided with the description and illustration of the present application, one skilled in the art may envision variations, modifications, and alternate aspects falling within the spirit of the broader aspects of the general inventive concept embodied in this application that do not depart from the broader scope of the claimed invention.

I claim:

1. A system for generating suggestions for arranging content, the system comprising:
   at least one processor; and
   memory, operatively connected to the at least one processor and storing instructions that, when executed by the at least processor, cause the at least one processor to perform a method for generating suggestions for arranging content, the method comprising:
   receiving a content file from a computing device, the content file including a content region and a content element to be arranged in the content region;
   analyzing the content file to select a blueprint for the content region;
   generating a suggestion for arranging the content element in the content region based on the selected blueprint; and
   causing the suggestion to be transmitted the computing device.

2. The system of claim 1, wherein:
   the method further comprises generating instructions to transform the content region according to the generated suggestion; and
   causing the suggestion to be transmitted to the computing device comprises causing the instructions to be transmitted to the computing device.

3. The system of claim 1, wherein causing the suggestion to be transmitted to the computing device comprises causing at least a portion of an updated content file to be transmitted to the computing device, the updated content file including the content region arranged according to the generated suggestion.

4. The system of claim 1, wherein analyzing the content file to select a blueprint for the content region comprises:
   identifying at least one blueprint that is compatible with the content file; and
   selecting a blueprint from the at least one identified blueprint based on characteristics of the content region.

5. The system of claim 4, wherein identifying at least one blueprint that is compatible with the content file comprises identifying blueprints that are compatible with a theme of the content file.

6. The system of claim 4, wherein selecting a blueprint from the at least one identified blueprint based on characteristics of the content region comprises:
   classifying the content element to determine a content type; and
   selecting a blueprint that is compatible with the determined content type.

7. The system of claim 4, wherein selecting a blueprint from the at least one identified blueprint based on characteristics of the content region comprises:
   identifying a salient region of the content element, wherein the salient region comprises a portion of the content element that appears to be important;
   determining at least one characteristic of the identified salient region, including at least one of the height, the width, and the aspect ratio of the salient region; and
   selecting a blueprint that is compatible with the at least one determined characteristic of the salient region.

8. The system of claim 4, wherein selecting a blueprint from the at least one identified blueprint based on characteristics of the content region comprises:
   determining if the content element is croppable;
   when determined that the content element is croppable, selecting a blueprint that is compatible with cropped dimensions of the content element; and
   when determined that the content element is not croppable, selecting a blueprint that is compatible with the original dimensions of the content element.

9. The system of claim 4, wherein selecting a blueprint from the at least one identified blueprint based on characteristics of the content region comprises:
   determining a number of content elements in the content region; and
   selecting a blueprint that includes a number of content element placeholders that is at least equal to the number of content elements in the content region.

10. A method for generating suggestions for arranging content, the method comprising:

receiving a content file from a computing device, the content file including a content region and a content element for arrangement in the content region;

analyzing the content file to select at least one blueprint from a blueprint file for the content region;

generating at least one suggestion for arranging the content element in the content region based on the at least one selected blueprint; and causing the at least one suggestion to be transmitted to the computing device.

11. The method of claim 10, wherein the at least one blueprint file is formatted according to the same file format as the content file.

12. The method of claim 11, wherein the at least one blueprint file is formatted according to a presentation file format.

13. The method of claim 10, wherein the at least one blueprint file includes a content region, wherein the content region includes at least one content element placeholder and at least one tag that defines characteristics of the at least one blueprint.

14. The method of claim 13, wherein the at least one content element placeholder is a shape in the content region and the at least one tag comprises textual data stored in an alternate text field of the shape, wherein the at least one tag defines characteristics of the content element placeholder.

15. The method of claim 13, wherein the at least one tag comprises textual data stored in a notes field of the content region and defines characteristics of the content region.

16. The method of claim 13, wherein the at least one tag includes at least one of a tag indicating to crop an content element to fit a content element placeholder, a tag indicating to replace a content element placeholder with a content element, and a tag indicating the position of a focus region within a content element placeholder.

17. The method of claim 11, wherein:
the at least one suggestion comprises a plurality of suggestions;
the method further comprises calculating scores for the plurality of suggestions, wherein the scores correspond to a predicted suitability of the suggestion for the content region; and
at least some of the plurality of suggestions are transmitted to the computing device in an order based on the calculated scores.

18. The method of claim 17, further comprising:
receiving, from the computing device, suggestion selection information that indicates which suggestion was selected by a user;
recording the suggestion selection information; and
using the suggestion selection information in generating and scoring suggestions.

19. A system for generating suggestions for arranging content, the system comprising:
at least one processor;
a communication device operatively connected to the at least one processor; and
memory, operatively connected to the at least one processor and storing instructions that, when executed by the at least processor, cause the at least one processor to perform a method for generating suggestions for arranging content, the method comprising:
receiving, over a network using the communication device, a content file from a computing device, the content file including a content region and a content element for the content region, the content element to be arranged in the content region;
identifying at least one blueprint that is compatible with a theme of the content file;
selecting a blueprint from the at least one identified blueprint based on characteristics of the content region;
generating at least one suggestion for arranging the content region based on the at least one selected blueprint;
generating at least one set of instructions to transform the content region according to the at least one generated suggestion; and
transmitting, over the network using the communication device, the at least one set of instructions to the computing device.

20. The system of claim 19, wherein selecting a blueprint from the at least one identified blueprint based on characteristics of the content region comprises:
classifying the content element to determine a content type;
identifying a salient region of the content element, wherein the salient region comprises a portion of the content element that appears to be important;
determining at least one characteristic of the identified salient region, including at least one of the height, the width, and the aspect ratio of the salient region;
determining if the content element is croppable; and
selecting a blueprint based on the determined content type, the determined at least one characteristic of the salient region, and whether the content element is croppable.

* * * * *